(12) United States Patent
Ikemoto et al.

(10) Patent No.: US 7,296,866 B2
(45) Date of Patent: Nov. 20, 2007

(54) EJECTION CONTROL DEVICE, LIQUID-EJECTING APPARATUS, EJECTION CONTROL METHOD, RECORDING MEDIUM, AND PROGRAM

(75) Inventors: Yuichiro Ikemoto, Kanagawa (JP); Kazuyasu Takenaka, Tokyo (JP); Iwao Ushinohama, Kanagawa (JP); Soichi Kuwahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 310 days.

(21) Appl. No.: 10/941,507

(22) Filed: Sep. 15, 2004

(65) Prior Publication Data

US 2005/0068357 A1    Mar. 31, 2005

(30) Foreign Application Priority Data

Sep. 18, 2003  (JP) ............................. 2003-325867
Sep. 30, 2003  (JP) ............................. 2003-339356

(51) Int. Cl.
*B41J 29/38* (2006.01)
(52) U.S. Cl. ......................................... 347/14; 347/15
(58) Field of Classification Search ................ 347/14, 347/15
See application file for complete search history.

(56) References Cited

U.S. PATENT DOCUMENTS 4,905,022 A    2/1990  Nagasawa et al.
5,126,531 A    6/1992  Majima et al.
6,631,963 B1   10/2003 Ando et al.
6,695,434 B2 * 2/2004  Konno et al. .................. 347/43

FOREIGN PATENT DOCUMENTS

| EP | 0925924 | 6/1999 |
| EP | 1157844 | 11/2001 |
| EP | 1 164 013 | 12/2001 |
| EP | 1231066 | 8/2002 |
| WO | WO 01/39981 | 6/2001 |

* cited by examiner

*Primary Examiner*—Thinh Nguyen
(74) *Attorney, Agent, or Firm*—Robert J. Depke; Rockey, Depke & Lyons, LLC.

(57) ABSTRACT

An ejection control device includes a memory for storing a correspondence table between gray-scale data items and ejection pattern data items, each gray-scale data item determining the number of droplets to be ejected to a corresponding pixel so as to express a desired gray-scale level of the pixel, each ejection pattern data item determining the ejection timing of droplets; and a converter for converting each gray-scale data item of the corresponding pixel to the corresponding ejection pattern data item by referring to the table. In the table, the setting of the ejecting position can be freely adjusted. In particular, an ejection pattern having ejection data bits discretely distributed for one pixel range can be easily achieved. Moreover, compliance with system changes can be achieved simply by rewriting the table.

17 Claims, 27 Drawing Sheets

FIG. 4

|       | 1 | 2 | 3 | 4 | 5 | 6 | 7 | 8 |
|-------|---|---|---|---|---|---|---|---|
| PNM0  | 0 | 0 | 0 | 0 | 0 | 0 | 0 | 0 |
| PNM1  | 0 | 0 | 0 | 0 | 0 | 1 | 0 | 0 |
| PNM2  | 0 | 0 | 0 | 0 | 1 | 1 | 0 | 0 |
| PNM3  | 0 | 0 | 0 | 0 | 1 | 1 | 1 | 0 |
| PNM4  | 0 | 0 | 0 | 0 | 1 | 1 | 1 | 1 |
| PNM5  | 0 | 0 | 0 | 1 | 1 | 1 | 1 | 1 |
| PNM6  | 0 | 0 | 1 | 1 | 1 | 1 | 1 | 1 |
| PNM7  | 0 | 1 | 1 | 1 | 1 | 1 | 1 | 1 |
| PNM8  | 1 | 1 | 1 | 1 | 1 | 1 | 1 | 1 |

FIG. 6

TABLE 1

|      | 1 | 2 | 3 | 4 | 5 | 6 | 7 | 8 |
|------|---|---|---|---|---|---|---|---|
| PNM1 | 0 | 0 | 0 | 0 | 0 | 1 | 0 | 0 |
| PNM2 | 0 | 0 | 0 | 0 | 1 | 1 | 0 | 0 |
| PNM3 | 0 | 0 | 0 | 0 | 1 | 1 | 1 | 0 |
| PNM4 | 0 | 0 | 0 | 0 | 1 | 1 | 1 | 1 |
| PNM5 | 0 | 0 | 0 | 1 | 1 | 1 | 1 | 1 |
| PNM6 | 0 | 0 | 1 | 1 | 1 | 1 | 1 | 1 |
| PNM7 | 0 | 1 | 1 | 1 | 1 | 1 | 1 | 1 |
| PNM8 | 1 | 1 | 1 | 1 | 1 | 1 | 1 | 1 |

TABLE 2

|      | 1 | 2 | 3 | 4 | 5 | 6 | 7 | 8 |
|------|---|---|---|---|---|---|---|---|
| PNM1 | 0 | 0 | 0 | 1 | 0 | 0 | 0 | 0 |
| PNM2 | 0 | 0 | 1 | 1 | 0 | 0 | 0 | 0 |
| PNM3 | 0 | 0 | 1 | 1 | 1 | 0 | 0 | 0 |
| PNM4 | 0 | 0 | 1 | 1 | 1 | 1 | 0 | 0 |
| PNM5 | 0 | 1 | 1 | 1 | 1 | 1 | 0 | 0 |
| PNM6 | 1 | 1 | 1 | 1 | 1 | 1 | 0 | 0 |
| PNM7 | 1 | 1 | 1 | 1 | 1 | 1 | 1 | 0 |
| PNM8 | 1 | 1 | 1 | 1 | 1 | 1 | 1 | 1 |

⋮

TABLE n

|      | 1 | 2 | 3 | 4 | 5 | 6 | 7 | 8 |
|------|---|---|---|---|---|---|---|---|
| PNM1 | 0 | 0 | 0 | 0 | 0 | 1 | 0 | 0 |
| PNM2 | 0 | 0 | 0 | 0 | 0 | 1 | 0 | 1 |
| PNM3 | 0 | 1 | 0 | 0 | 0 | 1 | 0 | 1 |
| PNM4 | 0 | 1 | 1 | 0 | 0 | 1 | 0 | 1 |
| PNM5 | 0 | 1 | 1 | 0 | 0 | 1 | 1 | 1 |
| PNM6 | 1 | 1 | 1 | 0 | 0 | 1 | 1 | 1 |
| PNM7 | 1 | 1 | 1 | 1 | 0 | 1 | 1 | 1 |
| PNM8 | 1 | 1 | 1 | 1 | 1 | 1 | 1 | 1 |

FIG. 7A

| 1 | 3 | 1 | 3 | 1 | 3 | 1 | 3 |
|---|---|---|---|---|---|---|---|
| 2 | N | 2 | N | 2 | N | 2 | N |
| 1 | 3 | 1 | 3 | 1 | 3 | 1 | 3 |
| 2 | N | 2 | N | 2 | N | 2 | N |
| 1 | 3 | 1 | 3 | 1 | 3 | 1 | 3 |
| 2 | N | 2 | N | 2 | N | 2 | N |

FIG. 7B

| 1 | 3 | 2 | 1 | 3 | 2 | 1 | 3 |
|---|---|---|---|---|---|---|---|
| 2 | N | 3 | 2 | N | 3 | 2 | N |
| 1 | 3 | 2 | 1 | 3 | 2 | 1 | 3 |
| 1 | 3 | 2 | 1 | 3 | 2 | 1 | 3 |
| 2 | N | 3 | 2 | N | 3 | 2 | N |
| 1 | 3 | 2 | 1 | 3 | 2 | 1 | 3 |

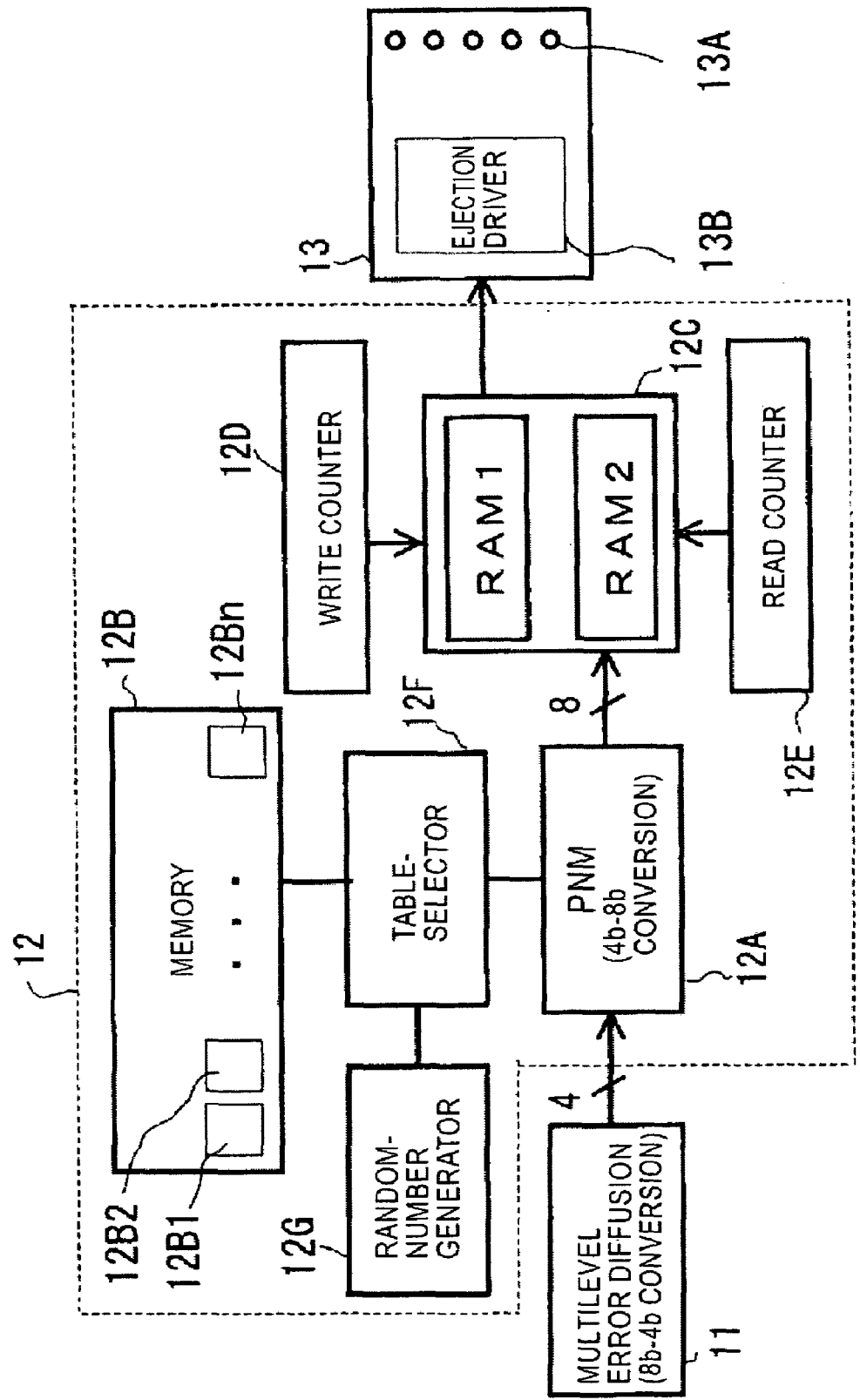

(PNM1)

(PNM2)

n-TH PIXEL PATTERN (n+1)TH PIXEL PATTERN

FIG. 21A
(n-1)TH PIXEL PATTERN

|  | PNM1 | PNM2 | PNM3 | PNM4 | PNM5 |
|---|---|---|---|---|---|
| 0 BIT | ▨ | ▨ | ▨ | ▨ | ▨ |
| 1 BIT | 1 | 1 | 1 | 1 | 1 |
| 2 BIT | 0 | 1 | 1 | 1 | 1 |
| 3 BIT | ▨ | ▨ | ▨ | ▨ | ▨ |
| 4 BIT | 0 | 0 | 1 | 1 | 1 |
| 5 BIT | 0 | 0 | 0 | 1 | 1 |
| 6 BIT | ▨ | ▨ | ▨ | ▨ | ▨ |
| 7 BIT | 0 | 0 | 0 | 0 | 1 |

FIG. 21B
n-TH PIXEL PATTERN

|  | PNM1 | PNM2 | PNM3 | PNM4 | PNM5 |
|---|---|---|---|---|---|
| 0 BIT | 1 | 1 | 1 | 1 | 1 |
| 1 BIT | ▨ | ▨ | ▨ | ▨ | ▨ |
| 2 BIT | 0 | 1 | 1 | 1 | 1 |
| 3 BIT | 0 | 0 | 1 | 1 | 1 |
| 4 BIT | ▨ | ▨ | ▨ | ▨ | ▨ |
| 5 BIT | 0 | 0 | 0 | 1 | 1 |
| 6 BIT | 0 | 0 | 0 | 0 | 1 |
| 7 BIT | ▨ | ▨ | ▨ | ▨ | ▨ |

FIG. 21C
(n+1)TH PIXEL PATTERN

|  | PNM1 | PNM2 | PNM3 | PNM4 | PNM5 |
|---|---|---|---|---|---|
| 0 BIT | 1 | 1 | 1 | 1 | 1 |
| 1 BIT | 0 | 1 | 1 | 1 | 1 |
| 2 BIT | ▨ | ▨ | ▨ | ▨ | ▨ |
| 3 BIT | 0 | 0 | 1 | 1 | 1 |
| 4 BIT | 0 | 0 | 0 | 1 | 1 |
| 5 BIT | ▨ | ▨ | ▨ | ▨ | ▨ |
| 6 BIT | 0 | 0 | 0 | 0 | 1 |
| 7 BIT | 0 | 0 | 0 | 0 | 0 |

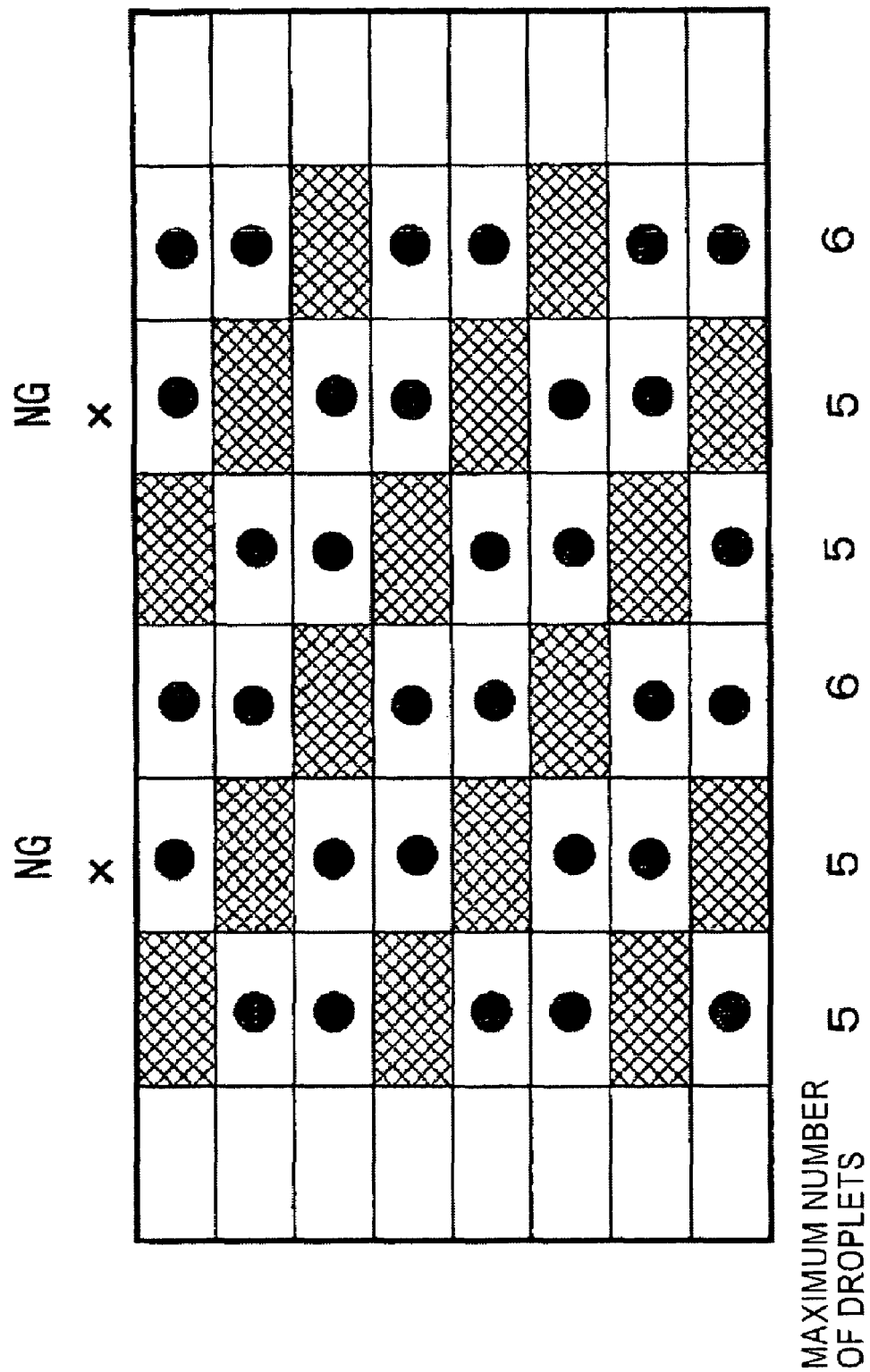

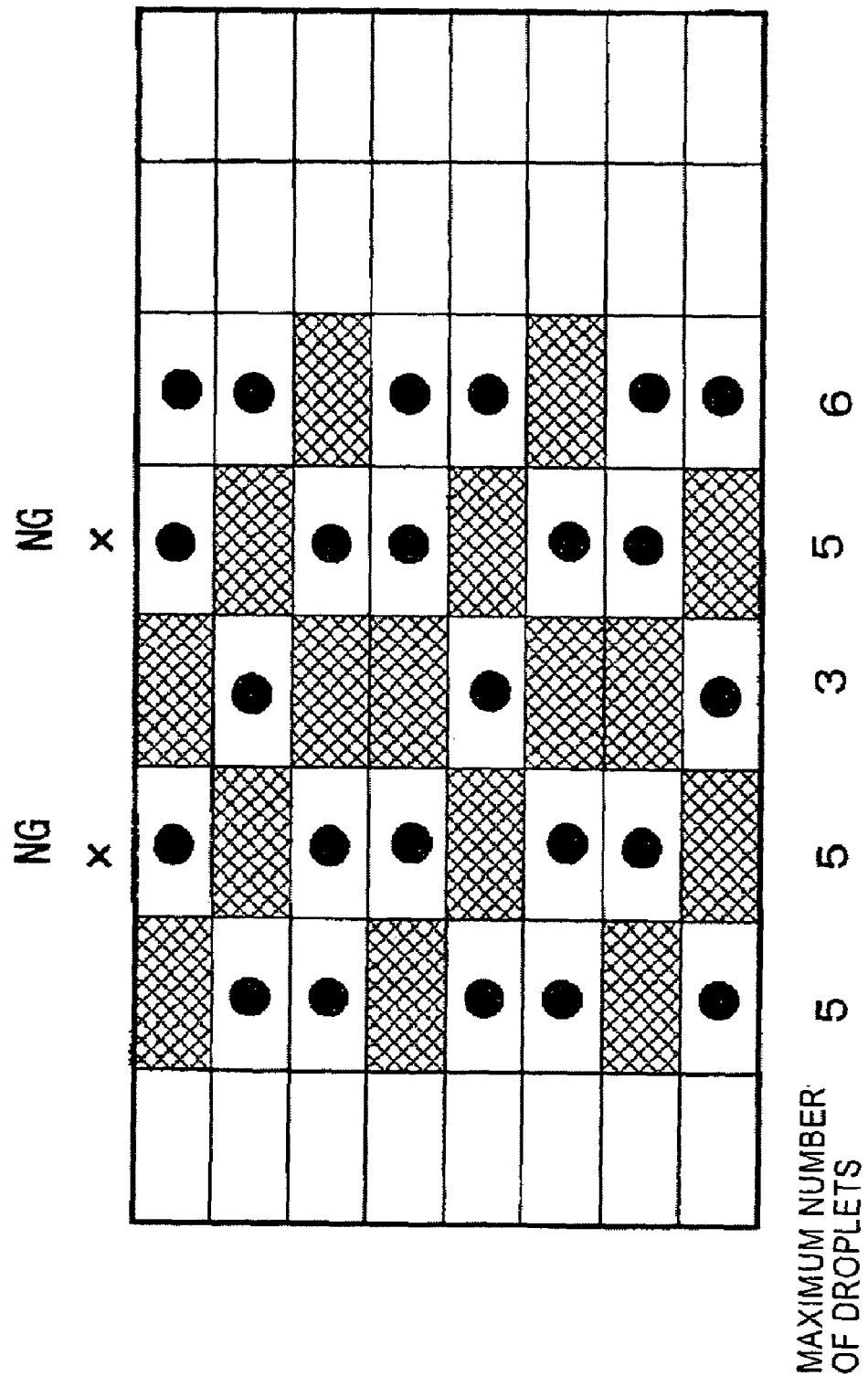

FIG. 27A

| 1 | 3 | 1 | 3 | 1 | 3 | 1 | 3 |
|---|---|---|---|---|---|---|---|
| 2 | N | 2 | N | 2 | N | 2 | N |
| 1 | 3 | 1 | 3 | 1 | 3 | 1 | 3 |
| 2 | N | 2 | N | 2 | N | 2 | N |
| 1 | 3 | 1 | 3 | 1 | 3 | 1 | 3 |
| 2 | N | 2 | N | 2 | N | 2 | N |

FIG. 27B

| 1 | 3 | 2 | 1 | 3 | 2 | 1 | 3 |
|---|---|---|---|---|---|---|---|
| 2 | N | 3 | 2 | N | 3 | 2 | N |
| 1 | 3 | 2 | 1 | 3 | 2 | 1 | 3 |
| 1 | 3 | 2 | 1 | 3 | 2 | 1 | 3 |
| 2 | N | 3 | 2 | N | 3 | 2 | N |
| 1 | 3 | 2 | 1 | 3 | 2 | 1 | 3 |

EJECTION CONTROL DEVICE, LIQUID-EJECTING APPARATUS, EJECTION CONTROL METHOD, RECORDING MEDIUM, AND PROGRAM

The present application claims priority to Japanese Patent Application JP2003-325867, filed in the Japanese Patent Office Sep. 18, 2003, and Japanese Patent Application JP2003-339356, filed in the Japanese Patent Office Sep. 30, 2003; the entire contents of which are incorporated herein by reference.

BACKGROUND OF THE INVENTION

1. Field of the Invention

The present invention relates to a liquid-ejecting apparatus for ejecting droplets to an object, and to an ejection control device for controlling such an ejecting operation. Furthermore, the present invention relates to a method and a program for controlling such an ejection operation. Moreover, the present invention relates to a recording medium having the program recorded thereon.

2. Description of the Related Art

One of known techniques for gray-scale expression of a printing image is a pulse-number modulation technique. According to such a technique, each pixel, which is the smallest unit in an image, is expressed with a group of droplets having a small diameter. Depending on the number of droplets, the visual appearance of the diameter of each pixel changes. The visual differences in the pixel diameter give different gray-scale levels of pixels to a viewer. Here, the term "the number of droplets" refers to the number of droplets ejected to a pixel range of one pixel.

An application of such a pulse-number modulation technique is disclosed in WO01/039981 PCT Gazette. According to WO01/039981 PCT Gazette, droplets are ejected in a consecutive manner based on gray-scale data, i.e. data for determining the number of droplets to be ejected to one pixel range. For example, according to a gray-scale-level data item PNM5, five droplets are to be ejected in a consecutive manner. In detail, the gray-scale data and the pulse number are compared, and a signal that allows droplets to be ejected until the pulse number exceeds the number corresponding to the gray-scale data is generated.

However, such a technique that generates a driving signal based on the comparison result is problematic (first problem) in that it requires a complicated circuit for the ejecting position with respect to the center of the corresponding pixel.

Furthermore, WO01/039981 PCT Gazette and Japanese Unexamined Patent Application Publication No. 2003-226017, for example, disclose a line head functioning as a head mechanism in a liquid-ejecting apparatus. Such a line head has a plurality of nozzles aligned thereon and can draw pixels simultaneously with respect to the number of nozzles provided.

Such a line head is problematic (second problem) in view of the fact that an extremely a large number of nozzles are provided. For this reason, there are cases where some of the nozzles cannot eject droplets properly.

SUMMARY OF THE INVENTION

Accordingly, it is an object of the present invention to solve these problems by providing a technology that allows easy and accurate setting for the ejecting positions of droplets and for the ejection timing. Moreover, it is another object of the present invention to provide a technology that allows compensation for malfunction of ejection with a simple structure.

The present invention employs one table or a plurality of tables. Here, a table is used as a correspondence between gray-scale data and ejection pattern data. In a table, each gray-scale data item is provided with one predetermined ejection pattern.

Each ejection pattern includes ejection data bits for determining whether or not a droplet is to be ejected. The ejection data bits are arranged in a time-series manner. For example, if an ejection data bit is set at "1", a droplet is to be ejected, whereas if an ejection data bit is set at "0", a droplet is not to be ejected. Accordingly, the ejecting positions and timing are determined based on where the ejection data bits "1" are located.

According to a first aspect of the present invention, an ejection control device is provided. The ejection control device includes a memory for storing a correspondence table between gray-scale data items and ejection pattern data items, each gray-scale data item determining the number of droplets to be ejected to a corresponding pixel so as to express a desired gray-scale level of the pixel, each ejection pattern data item determining the ejection timing of droplets; and a converter for converting each gray-scale data item of the corresponding pixel to the corresponding ejection pattern data item by referring to the table.

According to a second aspect of the present invention, an ejection control device is provided. Such an ejection control device includes a memory for storing multiple types of correspondence tables between gray-scale data items and ejection pattern data items, each gray-scale data item determining the number of droplets to be ejected to a corresponding pixel so as to express a desired gray-scale level of the pixel, each ejection pattern data item determining the ejection timing of droplets; a selector for selecting one of the tables; and a converter for converting each gray-scale data item of the corresponding pixel to the corresponding ejection pattern data item by referring to the table selected by the selector.

In the ejection control device according to the second aspect, the selector may select one of the tables based on the position of the corresponding pixel to be processed.

Furthermore, in the ejection control device according to the second aspect, the selector may select one of the tables based on a random number.

Moreover, each table may include at least one ejection pattern data item in which the ejection timing of droplets is non-consecutive.

Furthermore, the memory may be rewritable such that the content in each table can be changed.

According to a third aspect of the present invention, a liquid-ejecting apparatus is provided. Such a liquid-ejecting apparatus includes a memory for storing a correspondence table between gray-scale data items and ejection pattern data items, each gray-scale data item determining the number of droplets to be ejected to a corresponding pixel so as to express the desired gray-scale level of the pixel, each ejection pattern data item determining the ejection timing of droplets; a converter for converting each gray-scale data item of the corresponding pixel to the corresponding ejection pattern data item by referring to the table; and an ejection driver for ejecting droplets through a corresponding nozzle based on the ejection pattern data item.

According to a fourth aspect of the present invention, a liquid-ejecting apparatus is provided. Such a liquid-ejecting apparatus includes a memory for storing multiple types of correspondence tables between gray-scale data items and ejection pattern data items, each gray-scale data item determining the number of droplets to be ejected to a corresponding pixel so as to express a desired gray-scale level of the pixel, each ejection pattern data item determining the ejection timing of droplets; a selector for selecting one of the tables; a converter for converting each gray-scale data item of the corresponding pixel to the corresponding ejection pattern data item by referring to the table selected by the selector; and an ejection driver for ejecting droplets through a corresponding nozzle based on the ejection pattern data item.

According to a fifth aspect of the present invention, a method for controlling an ejecting operation is provided. Such a method includes the steps of referring to a correspondence table between gray-scale data items and ejection pattern data items, each gray-scale data item determining the number of droplets to be ejected to a corresponding pixel so as to express a desired gray-scale level of the pixel, each ejection pattern data item determining the ejection timing of droplets; and converting each gray-scale data item of the corresponding pixel to the corresponding ejection pattern data item based on the table.

According to a sixth aspect of the present invention, a method for controlling an ejecting operation is provided. Such a method includes the steps of selecting one of multiple types of correspondence tables between gray-scale data items and ejection pattern data items, each gray-scale data item determining the number of droplets to be ejected to a corresponding pixel so as to express a desired gray-scale level of the pixel, each ejection pattern data item determining the ejection timing of droplets; and converting each gray-scale data item of the corresponding pixel to the corresponding ejection pattern data item by referring to the selected table.

According to a seventh aspect of the present invention, a recording medium having a program recorded thereon is provided. Such a program can be read by a computer and allows the computer to refer to a correspondence table between gray-scale data items and ejection pattern data items, each gray-scale data item determining the number of droplets to be ejected to a corresponding pixel so as to express a desired gray-scale level of the pixel, each ejection pattern data item determining the ejection timing of droplets, whereby the computer converts each gray-scale data item of the corresponding pixel to the corresponding ejection pattern data item based on the table.

According to an eighth aspect of the present invention, a recording medium having a program recorded thereon is provided. Such a program can be read by a computer and allows the computer to select one of multiple types of correspondence tables between gray-scale data items and ejection pattern data items, each gray-scale data item determining the number of droplets to be ejected to a corresponding pixel so as to express a desired gray-scale level of the pixel, each ejection pattern data item determining the ejection timing of droplets, whereby the computer converts each gray-scale data item of the corresponding pixel to the corresponding ejection pattern data item by referring to the selected table.

According to a ninth aspect of the present invention, a program for allowing a computer to refer to a correspondence table between gray-scale data items and ejection pattern data items is provided. Each gray-scale data item determines the number of droplets to be ejected to a corresponding pixel so as to express a desired gray-scale level of the pixel. Each ejection pattern data item determines the ejection timing of droplets. The computer converts each gray-scale data item of the corresponding pixel to the corresponding ejection pattern data item based on the table.

According to a tenth aspect of the present invention, a program for allowing a computer to select one of multiple types of correspondence tables between gray-scale data items and ejection pattern data items is provided. Each gray-scale data item determines the number of droplets to be ejected to a corresponding pixel so as to express a desired gray-scale level of the pixel. Each ejection pattern data item determines the ejection timing of droplets. The computer converts each gray-scale data item of the corresponding pixel to the corresponding ejection pattern data item by referring to the selected table.

According to an eleventh aspect of the present invention, an ejection control device for controlling ejection of droplets for a liquid-ejecting apparatus provided with an ejection head is provided. The ejection head has nozzles each being capable of ejecting droplets to multiple pixel ranges by deflection of the droplets. The ejection control device includes a determiner for determining whether or not each gray-scale data item subject to conversion corresponds to a pixel affected by malfunction of ejection; and a converter for converting the gray-scale data item subject to conversion to an ejection pattern data item. Based on the determination result by the determiner, if the gray-scale data item corresponds to a pixel not affected by malfunction of ejection, the converter converts the gray-scale data item to the ejection pattern data item by referring to a first table for a pixel not affected by malfunction of ejection. Based on the determination result by the determiner, if the gray-scale data item corresponds to a pixel affected by malfunction of ejection, the converter converts the gray-scale data item to the ejection pattern data item by referring to a second table in which ejection data bits are arranged in a manner such that droplets are to be deflectively ejected only from nozzles that function properly.

In the ejection control device of the eleventh aspect, the second table may comprise first and second table components, the first table component being used for a nozzle which is determined to be malfunctional, the second table component being used for a nozzle adjacent to the malfunctional nozzle in the deflecting direction.

Furthermore, one of the first and second tables may comprise multiple types of table components, and the ejection control device may further comprise a selector for selecting one of the table components for gray-scale data conversion.

According to a twelfth aspect of the present invention, a liquid-ejecting apparatus provided with an ejection head is provided. Each of nozzles disposed in the ejection head is capable of ejecting droplets to multiple pixel ranges by deflection of the droplets. Such a liquid-ejecting apparatus includes a determiner for determining whether or not each gray-scale data item subject to conversion corresponds to a pixel affected by malfunction of ejection; a converter for converting the gray-scale data item subject to conversion to an ejection pattern data item; and an ejection driver for ejecting droplets based on the ejection pattern data item via the ejection head. Based on the determination result by the determiner, if the gray-scale data item corresponds to a pixel not affected by malfunction of ejection, the converter converts the gray-scale data item to the ejection pattern data item by referring to a first table for a pixel not affected by malfunction of ejection. On the other hand, based on the determination result by the determiner, if the gray-scale data item corresponds to a pixel affected by malfunction of ejection, the converter converts the gray-scale data item to the ejection pattern data item by referring to a second table in which ejection data bits are arranged in a manner such that droplets are to be deflectively ejected only from nozzles that function properly.

According to a thirteenth aspect of the present invention, a method for controlling ejection of droplets for a liquid-ejecting apparatus provided with an ejection head is provided. Each of nozzles disposed in the ejection head is capable of ejecting droplets to multiple pixel ranges by deflection of the droplets. Such a method includes the steps of determining whether or not each gray-scale data item subject to conversion corresponds to a pixel affected by malfunction of ejection; and converting the gray-scale data item subject to conversion to an ejection pattern data item. Based on the determination result by the determiner, if the gray-scale data item corresponds to a pixel not affected by malfunction of ejection, the converter converts the gray-scale data item to the ejection pattern data item by referring to a first table for a pixel not affected by malfunction of ejection. On the other hand, based on the determination result by the determiner, if the gray-scale data item corresponds to a pixel affected by malfunction of ejection, the converter converts the gray-scale data item to the ejection pattern data item by referring to a second table in which ejection data bits are arranged in a manner such that droplets are to be deflectively ejected only from nozzles that function properly.

According to a fourteenth aspect of the present invention, a recording medium having a program recorded thereon is provided. Such a program can be read by a computer and allows the computer to determine whether or not each gray-scale data item subject to conversion corresponds to a pixel affected by malfunction of ejection. Based on the determination result, the program allows the computer to convert the gray-scale data item subject to conversion to an ejection pattern data item by referring to a first table for a pixel not affected by malfunction of ejection if the gray-scale data item corresponds to a pixel not affected by malfunction of ejection. On the other hand, the program allows the computer to convert the gray-scale data item subject to conversion to an ejection pattern data item by referring to a second table in which ejection data bits are arranged in a manner such that droplets are to be deflectively ejected only from nozzles that function properly if the gray-scale data item corresponds to a pixel affected by malfunction of ejection.

According to a fifteenth aspect of the present invention, a program for allowing a computer to determine whether or not each gray-scale data item subject to conversion corresponds to a pixel affected by malfunction of ejection is provided. Based on the determination result, the program allows the computer to convert the gray-scale data item subject to conversion to an ejection pattern data item by referring to a first table for a pixel not affected by malfunction of ejection if the gray-scale data item corresponds to a pixel not affected by malfunction of ejection. On the other hand, the program allows the computer to convert the gray-scale data item subject to conversion to an ejection pattern data item by referring to a second table in which ejection data bits are arranged in a manner such that droplets are to be deflectively ejected only from nozzles that function properly if the gray-scale data item corresponds to a pixel affected by malfunction of ejection.

BRIEF DESCRIPTION OF THE DRAWINGS

FIG. 4 illustrates an example of a table for gray-scale data conversion;

FIG. 6 illustrates other examples of tables for gray-scale data conversion;

FIGS. 7A and 7B each illustrate a table used for selecting one of the tables for gray-scale data conversion;

FIG. 8 illustrates a signal processing unit according to a third embodiment of the present invention;

FIGS. 21A, 21B, and 21C each illustrate a table for a malfunctional nozzle or a table for a nozzle affected by malfunction of ejection;

FIG. 22 illustrates an example in which two nozzles are malfunctional, the two nozzles having two normal nozzles therebetween;

FIG. 23 illustrates an example in which every other nozzle is malfunctional;

FIGS. 27A and 27B each illustrate an example of a table used for the selection of the table components.

DESCRIPTION OF THE PREFERRED EMBODIMENTS

Figure 1:
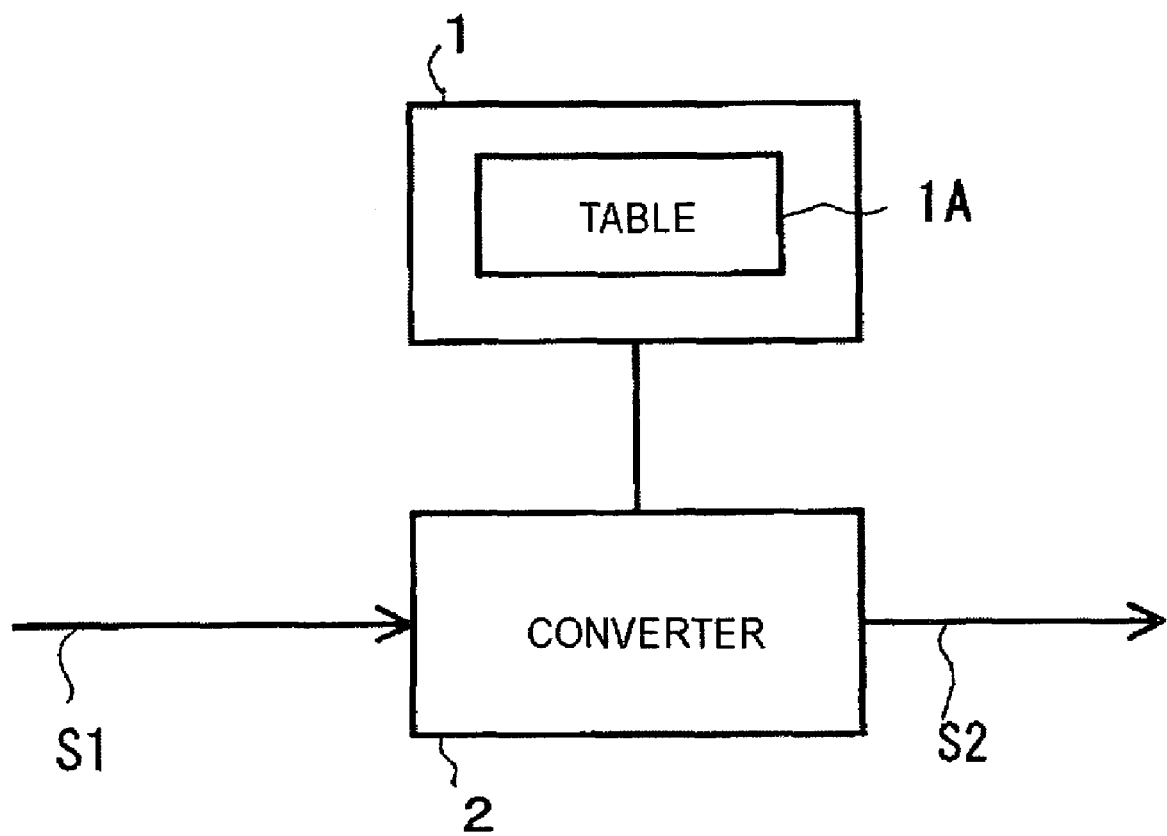
FIG. 1 is a functional block diagram of an example of the present invention.

Referring to FIG. 1, an example of an ejection control device according to the present invention is illustrated. A memory 1 is for storing a table 1A. A read-only-memory (ROM) is commonly used for the memory 1. Alternatively, a random-access-memory (RAM) or other semiconductor memory units may be used. If a RAM is used, the table 1A is freely rewritable.

Consequently, the ejecting positions can be changed to any positions. For example, for ejecting a plurality of droplets, all of the droplets can be ejected in a non-consecutive manner. In other words, each pixel can be drawn by ejecting a plurality of droplets to the corresponding pixel range in a discrete manner.

The converter 2 refers to the table 1A so as to convert gray-scale data S1 corresponding to a pixel to an ejection pattern data S2. The ejection pattern data S2 is read by the converter 2 based on the gray-scale data S1 as input data. The read ejection pattern data S2 is sent to an ejection driver.

The ejection driver heats a heater element to form a bubble in the liquid. This generates a pressure, thus ejecting a droplet. Alternatively, the ejection driver controls expansion and contraction of a piezoelectric element to eject a droplet.

Figure 2:
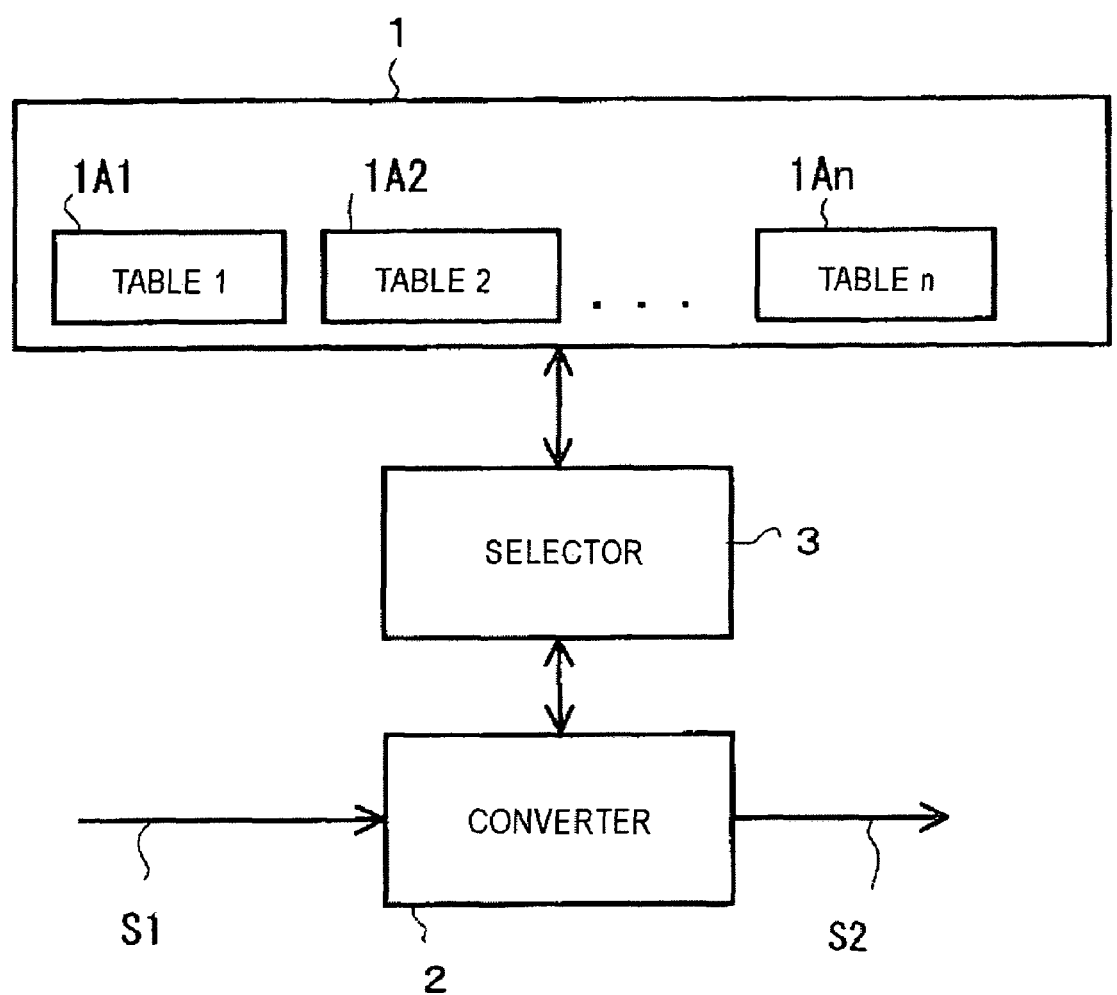
FIG. 2 is a functional block diagram of another example of the present invention.

Referring to FIG. 2, another example of an ejection control device according to the present invention is illustrated. Similar to the example in FIG. 1, the memory 1 stores tables and may be a ROM, a RAM, or other storing units.

In this example, the memory 1 stores multiple types of tables. Referring to FIG. 2, n types of tables 1A1, 1A2, . . . , 1An are stored in the memory 1, n being a positive integer equal to or greater than 2. Each table has at least one correspondence relationship between a gray-scale-level data item and an ejection pattern different from another table.

For example, an ejecting position of a droplet (ejection sub-period) in a gray-scale-level data item PNM1, in which one droplet is to be ejected, in one table is different from that of another table. This means that even if the same gray-scale data items are input, the ejecting positions of droplets are different depending on the types of tables used. Accordingly, based on the selection and adjustment of the tables, the result of the picture drawn is affected.

A selector 3 is for selecting a table 1Ai (i=1 to n) from the n types of tables. For example, according to the type of picture to be drawn or quality of the picture, an appropriate table can be selected. The types of pictures may be, for example, text, a photograph, a drawing, a video image, or a computer graphic image. The quality of the picture may be, for example, "bright quality", "standard quality" or "draft quality" related to an amount or density of droplets to be ejected, or monochrome printing or color printing.

Furthermore, the ejecting positions may be, for example, changed in a random manner or a pseudo-random manner. This prevents uneven distribution of the droplets. Moreover, this also prevents malfunction of ejection caused by the uneven distribution of the droplets.

It is preferable that a table be selected based on a random number generated by a random-number generator. It is also preferable that a table be selected based on the position of a corresponding pixel.

The selection of a table based on the position of a corresponding pixel is achieved by, for example, referring to an additional table containing a correspondence relationship between the position of a corresponding pixel and a table 1Ai (i=1 to n). The correspondence relationship between the pixel position and the table 1Ai (i=1 to n) may be provided for each pixel in the picture range. Furthermore, the picture range may be divided into sub-ranges, and a table may be provided for each sub-range.

Furthermore, for each input of gray-scale data, the tables may be switched in a routine manner based on the arranged order. Furthermore, the tables may be switched in a periodical manner based on a predetermined order. Consequently, the switching of the tables may be performed for every pixel or for every group of pixels. By switching the tables for every pixel or every group of pixels, a similar effect as to where the tables are switched in a random manner or pseudo-random manner can be achieved.

In this case, the converter 2 refers to the table 1Ai (i=1 to n) selected by the selector 3 so as to convert gray-scale data of a pixel to a corresponding ejection pattern. The example in FIG. 2 is different from the example in FIG. 1 in that a table used as a reference may be different for each conversion process of gray-scale data.

A compensation technique for malfunctional nozzles that cannot eject droplets will now be described. In such a technique, nozzles adjacent to the malfunctional nozzles are used as compensation nozzles. In detail, for example, by providing compensation data for adjacent nozzles that function properly, or by doubling the number of data for the non-ejecting portions, the non-ejecting sections can be made noticeable.

Figure 9:
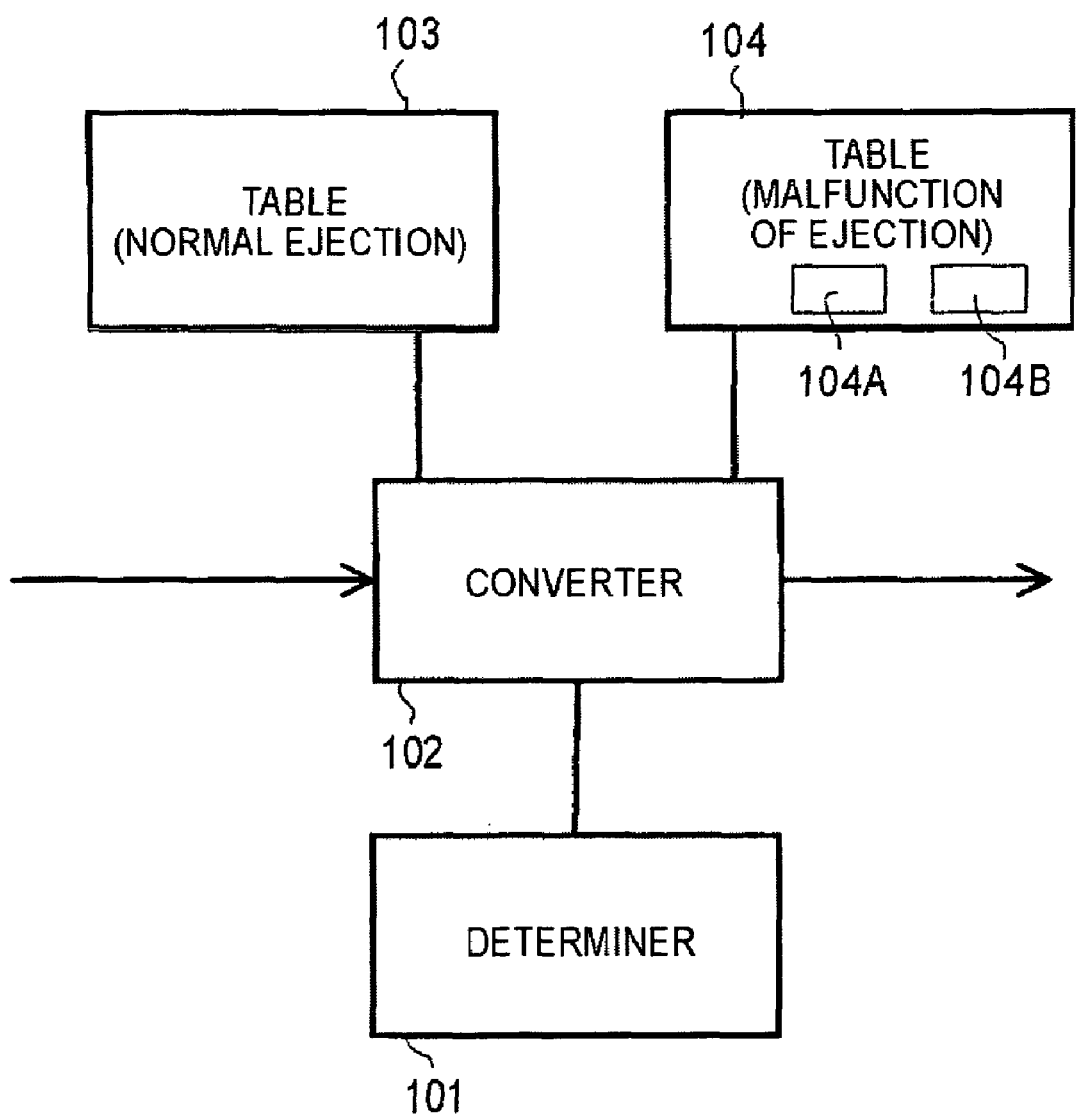
FIG. 9 is a functional block diagram of another example of the present invention.

An ejection control device for controlling droplet-ejection in a liquid-ejecting apparatus will now be described with reference to FIG. 9. The ejection control device includes an ejection head which is capable of ejecting droplets in a deflective manner from one nozzle to multiple pixel ranges.

The ejection control device includes a determiner 101 for determining the ejecting position, and a converter 102 for converting gray-scale data to ejection pattern data by referring to a table.

The determiner 101 determines whether or not each gray-scale data item subject to conversion corresponds to a pixel affected by malfunction of ejection. Such determination is for performing different control operation for a pixel not affected by malfunction of ejection and a pixel affected by malfunction of ejection.

Nozzles determined to be malfunctional include ones that cannot eject droplets at all and ones that cannot ejection droplets in the proper direction.

A pixel affected by malfunction of ejection is explicitly a pixel originally subject to droplet ejection with a nozzle determined to be malfunctional. Here, a pixel facing a malfunctional nozzle corresponds to a pixel to which a droplet is ejected in a deflective manner.

Figure 10:
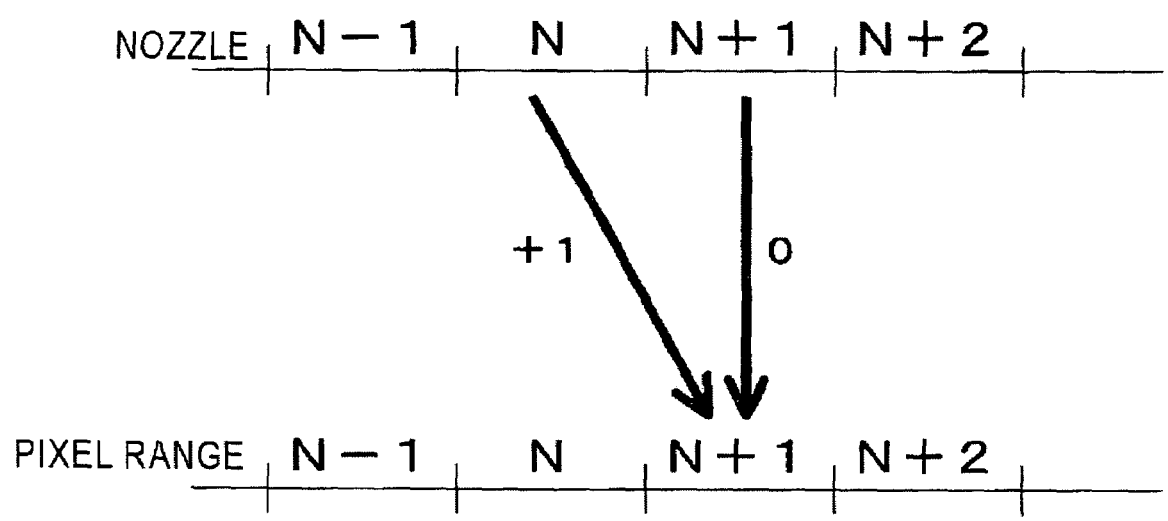
FIG. 10 illustrates a positional relationship between nozzles and pixel ranges in a case where droplets can be ejected from two directions in a deflective manner.

Specifically, referring to FIG. 10, pixel ranges N and (N+1) correspond to each other. In FIG. 10, reference numeral "0" indicates that a droplet is not to be deflected, and reference numeral "+1" indicates that a droplet is to be deflected.

In this case, if a nozzle N is malfunctional, the pixel range (N+1), to which a droplet is to be ejected from the nozzle N, corresponds to a pixel affected by malfunction of ejection. FIG. 10 illustrates a state where a droplet is deflected towards the right of the drawing.

Moreover, a droplet can be ejected to a position corresponding to two or more pixels away from a nozzle. Furthermore, a droplet can be deflected towards the left of the drawing. In that case, reference numeral "−1" is given as the ejecting direction. Alternatively, droplets may be deflected in both left and right directions.

The converter 102 selects one of two types of tables based on the determination result by the determiner 101. The converter 102 then converts the gray-scale data to ejection pattern data based on the selected table. Here, if the gray-scale data subject to conversion corresponds to a pixel not affected by malfunction of ejection, the converter 102 refers to a first table 103 for the corresponding pixel so as to convert the gray-scale data to appropriate ejection pattern data.

Furthermore, if the gray-scale data subject to conversion corresponds to a pixel affected by malfunction of ejection, the converter 102 refers to a second table 104 having ejection data bits arranged in a manner such that droplets are to be ejected only from nozzles functioning properly. Thus, the converter 102 converts the gray-scale data to appropriate ejection pattern data based on the second table 104.

In other words, the converter 102 refers to one of different types of tables, i.e. a table corresponding to a pixel drawn only through a normal nozzle (which will be referred to as a table for normal nozzles hereinafter) and a table corresponding to a pixel affected by malfunction of ejection (which will be referred to as a table for malfunction-related nozzles hereinafter), so as to convert the gray-scale data to appropriate ejection pattern data.

In that case, gray-scale data corresponding to a malfunction-related nozzle is converted such that droplets can be ejected in a deflective manner only through normal nozzles. Thus, a pixel can be drawn to a desired gray-scale level at its original position while being not affected by the malfunction of ejection.

For example, referring to FIG. 10, if the nozzle N is malfunctional, the nozzle N is not used for ejecting droplets to the pixel ranges N and (N+1). In other words, with respect to the pixel range N, a desired gray-scale expression can be achieved by ejecting a droplet from a nozzle (N−1). Moreover, with respect to the pixel range (N+1), a desired gray-scale expression can be achieved only by ejecting a droplet from the nozzle (N+1).

Furthermore, it is preferable that the second table 104 includes a table component 104A for a nozzle determined to be malfunctional, and a table component 104B for nozzles adjacent to the malfunctional nozzle in the deflecting direction.

Moreover, if one of the first and second tables 103 and 104 includes multiple types of table components, it is preferable that the ejection control device be provided with a selector for selecting one of the table components for gray-scale data conversion.

According to the present invention, ejection pattern data corresponding to the input gray-scale data can be output based on the correspondence relationship in the table. Moreover, according to the table, easy and accurate setting for the ejecting positions of droplets and for the ejection timing can be achieved. Furthermore, a droplet to be originally ejected from a malfunctional nozzle can be ejected in a deflective manner from a normal nozzle. Accordingly, all pixels can be expressed with desired gray-scale levels, or with practically sufficient quality.

Using a printer for ejecting ink droplets as an example, embodiments of a liquid-ejecting apparatus will be described. The essential features not specified in the present specification or in the drawings are selected from known ones in the technical field of the present invention.

In the descriptions below, the embodiments are realized by hardware, but software equivalent to such hardware may be used in place of the hardware.

In the embodiments described below, in a case where the present invention is used as a computer program, the program is stored in a recording medium which can be read by a computer.

Such a recording medium may be, for example, a magnetic recording medium, such as a magnetic disk (flexible disk or hard disk) or a magnetic tape. Alternatively, the recording medium may be, for example, an optical recording medium, such as an optical disk, an optical tape, or a bar-code which can be read by a machine. Furthermore, the recording medium may alternatively be a semiconductor memory unit, such as a random-access-memory (RAM) or a read-only-memory (ROM); or other physical units or media used for storing computer programs.

In a case where the present invention is realized by hardware, an application specific integrated circuit (ASIC) or other known units in the technical field of the present invention may be used.

1. First Embodiment

1-1. Circuit

Figure 3:
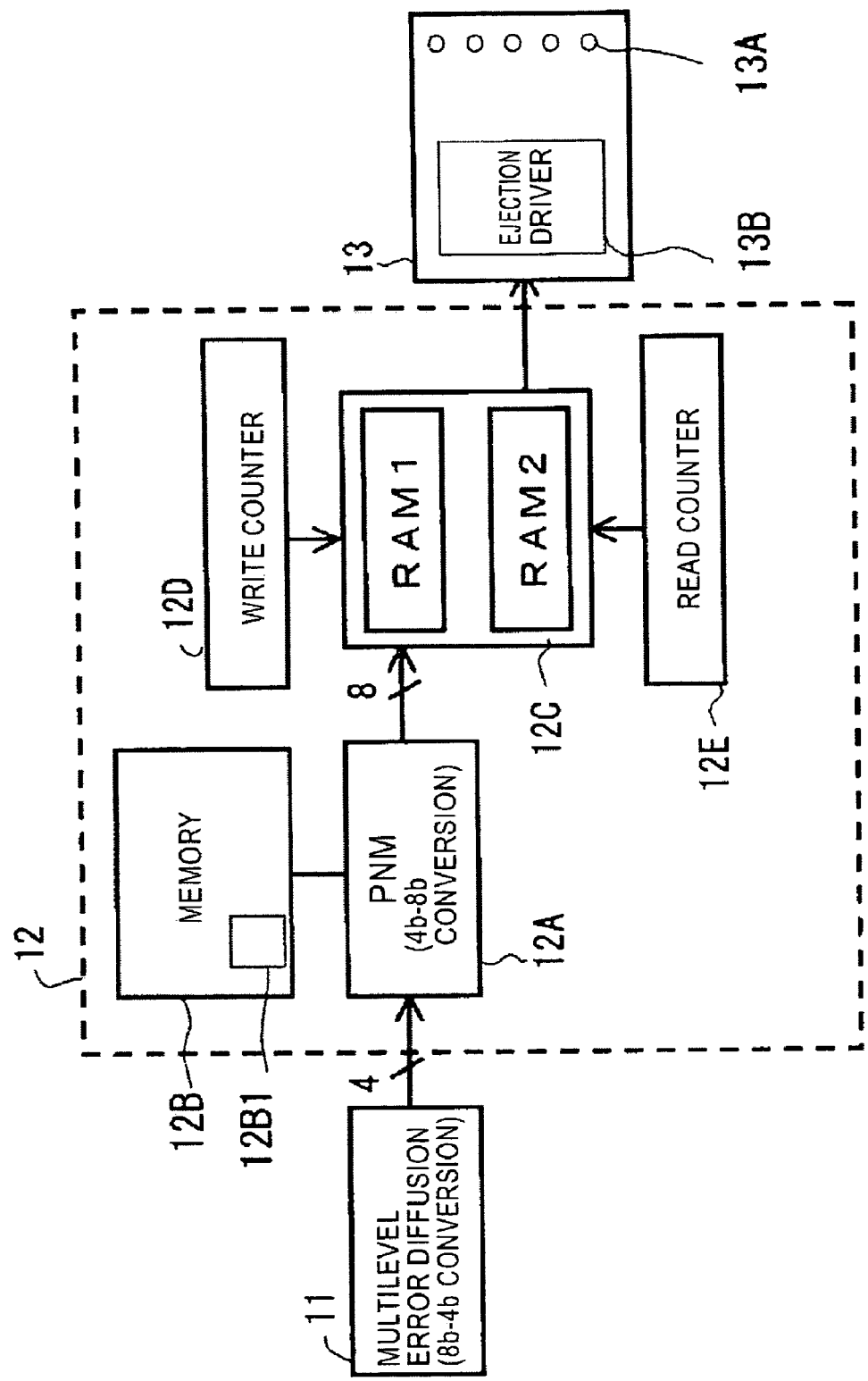
FIG. 3 illustrates a signal processing unit according to a first embodiment of the present invention.

FIG. 3 is a circuit diagram of a signal processing unit according to a first embodiment of the present invention. The signal processing unit includes three main components, that is, a digital-signal processor (DSP) 11, a head controller 12, and head chips 13.

The DSP 11 receives 8-bit image data, performs multi-level error diffusion on the image data, and then converts the 8-bit image data to 4-bit gray-scale data. The gray-scale data includes information for determining the number of droplets per pixel. According to the first embodiment, one pixel corresponds to a maximum of 8 droplets.

The gray-scale data is transferred by DMA (direct memory access) to the head controller 12. In detail, the gray-scale data is transferred in sequence as 4-bit data in a range of 0 to 7 for every pixel, i.e. dot, from the first address to the n-th address corresponding to the width of the head.

A pulse number modulator (PNM) 12A converts the input 4-bit gray-scale data to 8-bit ejection-pattern data by referring to an ejection-pattern memory 12B. Each bit in the ejection-pattern data corresponds to one ejection sub-period in a drawing period. In the first embodiment, a drawing period for one pixel includes eight ejection sub-periods.

The ejection-pattern memory 12B contains a look-up table 12B1. FIG. 4 illustrates an example of a look-up table 12B1 for gray-scale data conversion. According to this table 12B1, the row addresses correspond to the gray-scale data. The gray-scale data includes first to ninth gray-scale-level data items, namely, a first gray-scale-level data item in which no droplets are ejected in a drawing period of one pixel, a second gray-scale-level data item for discharging one droplet in a drawing period of one pixel, a third gray-scale-level data item for discharging two droplets in a drawing period of one pixel, and so on.

In FIG. 4, the first gray-scale-level data item is indicated by PNM0, the second gray-scale-level data item is indicated by PNM1, . . . , and the ninth gray-scale-level data item is indicated by PNM8. The number following PNM indicates the number of droplets included in one pixel.

Each bit address in the columns in the table 12B1 corresponds to one of the eight ejection sub-periods in a drawing period of one pixel. In other words, a first column address corresponds to a first ejection sub-period, a second column address corresponds to a second ejection sub-period, a third column address corresponds to a third ejection sub-period, . . . , and an eighth column address corresponds to an eighth ejection sub-period. Consequently, each ejection data bit "0" or "1" in the corresponding column address indicates whether or not a droplet is to be ejected in the corresponding ejection sub-period.

In FIG. 4, each ejection data bit "0" indicates that no droplet is to be ejected, and each ejection data bit "1"

indicates that a droplet is to be ejected. For example, in the first gray-scale-level data item PNM0, no droplets are to be ejected. This means that all ejection data bits in the first gray-scale-level data item PNM0 are set at "0". Accordingly, the first gray-scale-level data item PNM0 is given an ejection pattern "00000000".

Moreover, in the second gray-scale-level data item PNM1, for example, one droplet is to be ejected. This means that seven of the column addresses are given the ejection data bits "0", and one of the column addresses is given the ejection data bit "1". In FIG. 4, one droplet is to be ejected in the sixth ejection sub-period of the second gray-scale-level data item PNM1. Consequently, the second gray-scale-level data item PNM1 is given an ejection pattern "00000100".

Droplets can be ejected in other ejection sub-periods by providing an ejection pattern containing an ejection data bit "1" in the desired ejection sub-period for droplet-ejection. Accordingly, the ejection timing and position of each droplet are determined based on where the corresponding ejection data bit "1" is written.

Furthermore, in FIG. 4, the third gray-scale-level data item PNM2 is given an ejection pattern "00001100", and the fourth gray-scale-level data item PNM3 is given an ejection pattern "00001110". Similarly, for the remaining gray-scale-level data items, each data item is provided with an ejection pattern containing one ejection data bit "1" more than its previous data item. In FIG. 4, when the latter half of the sub-periods in one of the data items is completely filled with the ejection data bits "1", a new ejection data bit "1" is added to one of the sub-periods in the front half of the subsequent data item. The ninth gray-scale-level data item PNM8 is given an ejection pattern "11111111" in which all ejection data bits are set at "1".

According to the table 12B1 in FIG. 4, the ejection pattern data for all the drawing periods is set in a manner such that the ejection data bits "1" increase asymmetrically as the gray-scale-level data items becomes higher. On the other hand, the ejection timing of the droplets can be set individually for each gray-scale-level data item. This means that the ejection timing for each gray-scale-level data item can be set in a manner such that the sub-periods in which droplets are to be ejected may be separated by one non-ejecting sub-period or multiple non-ejecting sub-periods. Moreover, it is also possible to set the ejection timing of the droplets for the front half of the sub-periods for one of the gray-scale-level data items, while setting the ejection timing of the droplets for the latter half of the sub-periods for an adjacent gray-scale-level data item.

Accordingly, the ejection data bits "1" may be set in a non-consecutive manner within the same ejection pattern, and moreover, the ejection patterns may be set in a manner such that the same ejection data bits "1" are non-consecutive between adjacent gray-scale-level data items. In contrast, such setting is difficult in conventional circuits.

Referring to FIG. 3, a buffer memory 12C is provided for temporarily storing ejection pattern data sent from the PNM 12A. The buffer memory 12C has a double buffer structure that includes a RAM (random access memory) 1 and a RAM 2. One of the RAMs 1 and 2 inputs ejection pattern data while the other reads the ejection pattern data.

The RAMs 1 and 2 each have a memory capacity sufficient for storing ejection pattern data corresponding to the drawing range of each head chip 13. For example, in a case where a line head having nozzles aligned thereon is used, the number of row addresses provided is set to be more than the number of nozzles provided in each head chip 13 to be driven. Furthermore, in a case where the head chips 13 reciprocate, the number of row addresses provided is set to be more than the number of pixels to be drawn in a single scan period.

On the other hand, the number of column addresses provided is sufficient for recording an ejection pattern corresponding to each pixel. In the first embodiment, the number of column addresses provided corresponds to 8 bits.

Alternatively, the row addresses and the column addresses may be switched, meaning that the column addresses may correspond to the pixels and the row addresses may correspond to the ejection sub-periods.

Referring to FIG. 3, a write counter 12D is provided for generating a writing address for writing ejection pattern data in the buffer memory 12C. Since 8-bit ejection pattern data is input to the buffer memory 12C in a parallel manner, a row address of the corresponding pixel is generated.

On the other hand, a read counter 12E is provided for generating a reading address for reading ejection pattern data from the buffer memory 12C. In detail, the read counter 12E sequentially generates an address for reading an ejection data bit for every ejection sub-period.

Each head chip 13 ejects droplets through nozzles 13A based on the ejection data bits sent from the buffer memory 12C. The actual ejecting process is controlled by an ejection driver 13B.

In detail, FIG. 3 illustrates an example in which a line head has a plurality of nozzles 13A aligned in a direction perpendicular to the relative moving direction between the line head and the object to be drawn upon. Such a line head is a fixed head.

Alternatively, the first embodiment may be applied to a case where a line head reciprocates in a direction (secondary scanning direction) perpendicular to the relative moving direction (main scanning direction) between the line head and the object to be drawn upon. In that case, the ejection data bits of multiple ejection sub-periods are sent to each head chip 13 in a parallel manner.

Furthermore, the head chips 13 may alternatively be used in a non-line head having one nozzle or multiple nozzles, such that the head reciprocates in the secondary scanning direction. In that case, an ejection pattern is given in which each scan period corresponds to one ejection sub-period.

1-2. Operation

The operation of the signal processing unit shown in FIG. 3 will now be described. First, the DSP 11 performs multi-level error diffusion on image data or text data to be drawn so as to produce gray-scale data for each pixel. The gray-scale data is then transferred to the PNM 12A in the head controller 12.

While referring to the table 12B1 in the ejection-pattern memory 12B, the PNM 12A converts the gray-scale data to ejection pattern data. For example, if the gray-scale data corresponds to the first gray-scale-level data item, an ejection pattern "00000000" is output. If the gray-scale data corresponds to the second gray-scale-level data item, an ejection pattern "00001100" is output.

The converted ejection pattern data is input to the buffer memory 12C as 8-bit parallel data. Here, the ejection pattern data is alternately input to the RAMs 1 and 2 of the double buffer. For example, when the ejection pattern data is read from RAM 1, the ejection pattern data is written into RAM 2. Thus, ejection data bits in the same drawing period are read from the RAM 1 in a serial manner.

The read ejection data bits are sent to the ejection driver 13B of the corresponding head chip 13. The ejection driver 13B controls whether to eject or not to eject a droplet based on each ejection data bit. For example, the ejection driver 13B controls the supply of current to a heater element if the droplet ejection is performed based on expansion of bubbles. Moreover, if the droplet ejection is performed based on expansion and contraction of a piezoelectric element, for example, the ejection driver 13B controls such expansion and contraction.

Thus, a pattern image formed of pixels having desired gray scale levels is drawn onto the object.

1-3. Advantages of First Embodiment

According to the signal processing unit of the first embodiment, the look-up table 12B1 stored in the ejection-pattern memory 12B allows the gray-scale data to be converted to desired ejection pattern data. The look-up table 12B1 provides an extensive range of ejection patterns that can actually be drawn. For example, the droplets can be ejected in a non-consecutive manner.

Furthermore, although the gray-scale level data items change at a constant rate or at a gradual rate within a certain range, the ejection data bits in the ejection patterns between different gray-scale level data items, for example, may be set in a non-consecutive manner. This allows distributed use of the nozzles for the droplet ejection. As a result, sufficient time required for refilling the liquid after each ejection process can be provided, thus improving the quality of the drawn image. Moreover, this prevents the quality of the drawn image from deteriorating, which may be caused by vibration of the housing.

Furthermore, the first embodiment is capable of complying with system changes. For example, for changing the ejection pattern data, the only requirement is to rewrite the table 12B1. Specifically, in a case where the ejection timing of droplets in each gray-scale-level data item is to be changed, or the number of droplets or the number of sub-periods per pixel is to be readjusted, such compliance with system changes can readily be performed by rewriting the table 12B1.

2. Second Embodiment

2-1. Circuit

Figure 5:
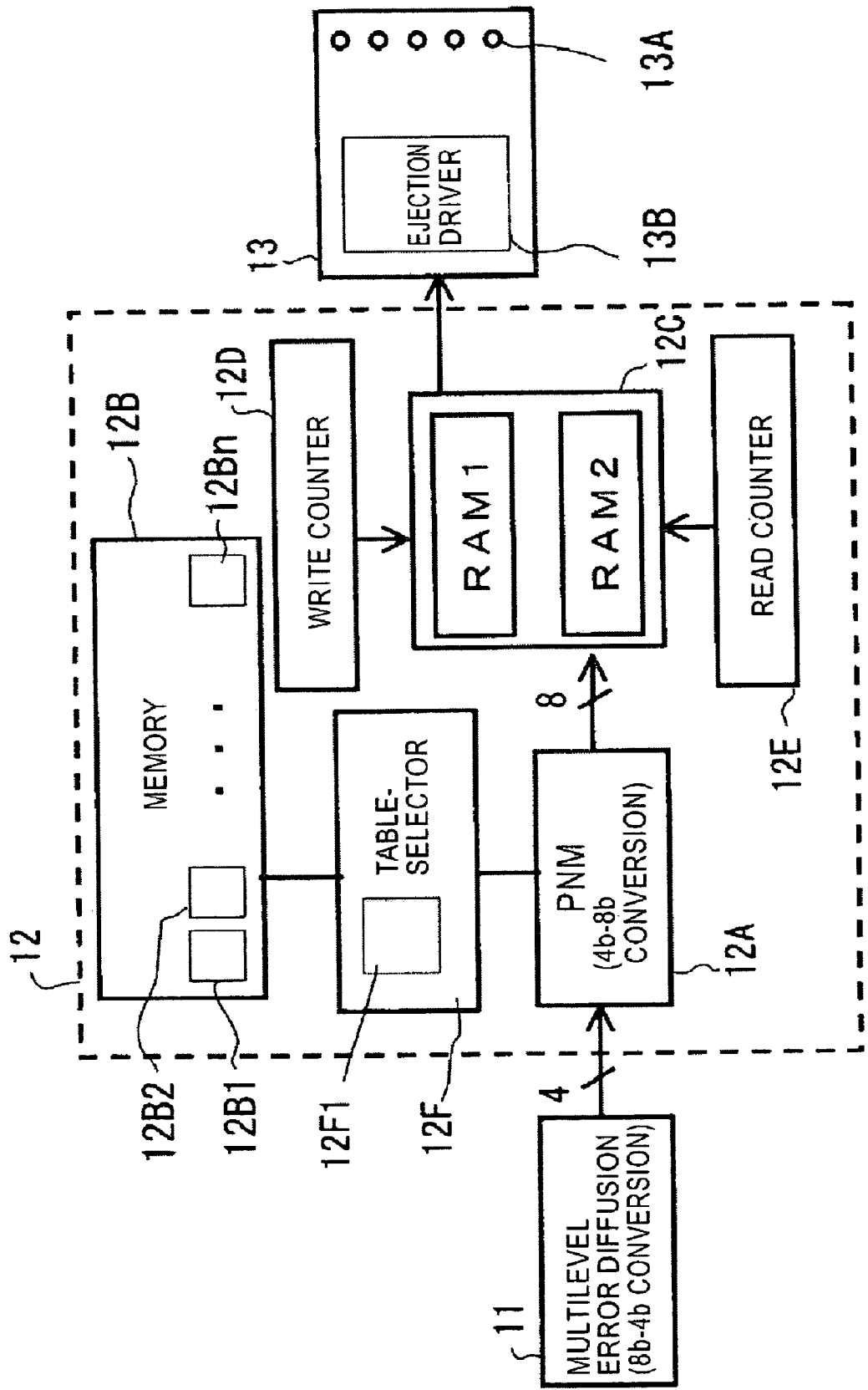
FIG. 5 illustrates a signal processing unit according to a second embodiment of the present invention.

FIG. 5 is a circuit diagram of a signal processing unit according to a second embodiment of the present invention. The signal processing unit in FIG. 5 similarly has three components, namely, the DSP 11, the head controller 12, and the head chips 13. However, the internal structure of the head controller 12 in the second embodiment is different from that of the first embodiment. Accordingly, the differences in the internal structure of the head controller 12 will be described below.

The second embodiment has two main features. One is that a plurality of look-up tables 12B1 to 12Bn for gray-scale data conversion is stored in the ejection-pattern memory 12B. The other is that the head controller 12 is provided with a table-selector 12F for selecting one of the look-up tables 12Bi (i=1 to n).

Other elements in the head controller 12, such as the PNM 12A, the buffer memory 12C, the write counter 12D, and the read counter 12E, are equivalent to those in the first embodiment, and descriptions of those elements will thus be omitted. Accordingly, the second embodiment will be described by only pointing out the distinctive features.

FIG. 6 illustrates examples of look-up tables stored in the ejection-pattern memory 12B. In detail, FIG. 6 illustrates a state where n look-up tables are stored in the ejection-pattern memory 12B, n being a positive integer equal to or greater than two. The ejection data bits in each gray-scale-level data item in one table are arranged differently from those in the corresponding data item of another table. It is preferable that the tables have different arrangement characteristics of the ejection patterns from one another. In other words, each table preferably has a distinctive arrangement characteristic of the ejection patterns.

For example, the tables 1 and 2 in FIG. 6 have distinctive characteristics in the ejection patterns of the lower gray-scale-level data items, i.e. PNM1 to PNM 4. In detail, in table 1, the droplet ejection is concentrated in the latter half of the sub-periods in the lower gray-scale data items. In table 2, the droplet ejection is concentrated between the front half and the central portion of the sub-periods. On the other hand, in table n, the timing of the droplet ejection is distributed in a discrete manner. Moreover, the droplet ejection is concentrated in the front half and the latter half of the sub-periods in the lower gray-scale-level data items. The tables in FIG. 6 are examples in which the consecutiveness of the same ejection data bits is permitted between ejection patterns of different gray-scale-level data items.

Alternatively, such consecutiveness of the same ejection data bits is not necessarily required in the second embodiment. In the second embodiment, however, the switching of the tables is done frequently to prevent the same ejection pattern from being used repeatedly. With respect to the ejection patterns corresponding to the same gray-scale-level data items between different tables, such consecutiveness of the same ejection data bits can generally be lowered by providing a larger number of stored tables. However, since the combination of the tables can be freely selected, it is difficult to state the general characteristics.

The table-selector 12F is for serially selecting a table to be used by the PNM 12A. According to the second embodiment, the selection of the tables by the table-selector 12F is performed based on the position of the corresponding pixel. In order to achieve this, look-up tables 12F1 are provided. FIGS. 7A and 7B illustrate examples of the look-up tables 12F1 for table selection. The row addresses and the column addresses in FIGS. 7A and 7B correspond to a range of pixels drawn by the corresponding head chip 13 to be driven.

In a case where a sufficient number of tables for gray-scale data conversion is provided for all the pixels in the drawing range, one of the look-up tables 12F1 for table selection allocates an appropriate table for gray-scale data conversion for each pixel in the drawing range. Such allocation of a table is performed in a manner such that the table is not used repeatedly. On the other hand, the look-up table 12F1 can also allocate the same table for gray-scale data conversion for pixels located distant from each other within the same drawing range.

Generally, as shown in FIGS. 7A and 7B, each look-up table 12F1 is formed of basic table units disposed in a repeated manner and each corresponding to a number of pixels. One of the basic table units is indicated by a section surrounded by a bold line. Specifically, FIG. 7A illustrates an example in which the basic table units are each composed of two rows by two columns and are disposed in a repeated manner. On the other hand, FIG. 7B illustrates an example in which the basic table units are each composed of three rows by three columns and are also disposed in a repeated manner.

Referring to the look-up table 12F1 of FIG. 7A, for a pixel corresponding to a position at row 1 and column 1, the table 1 is given for gray-scale data conversion. Furthermore, for a pixel corresponding to a position at row 2 and column 2, a table n is given for gray-scale data conversion. According to this example, adjacent pixels are given different types of tables for gray-scale data conversion.

The same applies to an example of the table 12F1 shown in FIG. 7B. However, according to the table 12F1 in FIG. 7B, the same type of tables appear in a repeated manner periodically in the column direction.

Alternatively, by storing only the basic table units in the table-selector 12F, the positional information in one of the basic table units corresponding to a pixel address may be read. For example, by determining a residue group having modulo 2, the addresses in each basic table unit may correspond to the row and column addresses.

Although the basic table units in the second embodiment are each composed of a square matrix having m rows by m columns, m being a positive integer equal to or greater than two, the composition of the basic table units is not limited to such a matrix. For example, each of the basic table units may alternatively be composed of a rectangular matrix in which the number of rows is greater than the number of columns, or vice versa. As a further alternative, although the control operation may become more complicated, each of the basic table units may be composed of a polygonal matrix having, for example, a substantially rhomboidal shape. In such a case, each rhomboidal-shaped basic table unit may be used as a correspondence between a pixel and the corresponding table for gray-scale data conversion.

2-2. Operation

The operation of the signal processing unit shown in FIG. 5 will now be described. First, the DSP 11 performs multi-level error diffusion on image data or text data to be drawn so as to produce gray-scale data for each pixel. The gray-scale data is then transferred to the PNM 12A in the head controller 12.

The PNM 12A then sends the gray-scale data to the table-selector 12F. The table-selector 12F detects the position of each pixel by, for example, counting the number of inputs of the gray-scale data. When the position of each pixel is detected, the table-selector 12F refers to the look-up table 12F1 so as to select an appropriate table for gray-scale data conversion based on the position of each pixel. For example, a look-up table n is selected.

When the table for gray-scale data conversion is selected, the gray-scale data is sent to the selected table. Thus, the PNM 12A reads the ejection pattern data corresponding to the gray-scale data. This reading process by the PNM 12A is performed by sending determination data for the tables 12B1 to 12Bn and the gray-scale data to the tables 12B1 to 12Bn as input addresses so as to read the corresponding ejection pattern data. Alternatively, for example, a switch may be used to select a table for gray-scale data conversion. In this case, the selected table for the gray-scale data conversion connected via the switch is used to read the corresponding ejection pattern data.

The process after reading the ejection pattern data is the same as in the first embodiment, and the description of such a process will thus be omitted.

2-3. Advantages of Second Embodiment

According to the signal processing unit of the second embodiment, the look-up tables for gray-scale data conversion can be switched according to the position of each pixel. Consequently, different types of tables for gray-scale data conversion are used for the pixels in a periodical manner. According to the second embodiment, even when data items of the same gray-scale level are input repeatedly, various types of ejection patterns can be output.

For example, even if the gray-scale-level data items PNM1 are repeatedly input, the ejecting positions are discretely distributed. This achieves, for example, smoother refilling of liquid after each droplet ejection process, and moreover, prevents the droplet ejection from being adversely affected by vibration of the housing of a printer, i.e. a liquid-ejecting apparatus.

In contrast, droplets are repeatedly ejected from the same position if the ejecting positions are not discretely distributed. This may adversely affect the refilling of liquid after each droplet ejection, and thus may lead to deterioration of picture quality. Moreover, if the droplets are repeatedly ejected from the same position, the deviation of droplets from the original ejecting position due to vibration of the housing may become noticeable.

3. Third Embodiment 3-1. Circuit

FIG. 8 is a circuit diagram of a signal processing unit according to a third embodiment of the present invention. The signal processing unit in FIG. 8 similarly has three components, namely, the DSP 11, the head controller 12, and the head chips 13. However, the internal structure of the head controller 12 in the third embodiment is different from those of the first and second embodiments. Accordingly, the differences in the internal structure of the head controller 12 will be described below.

The third embodiment is basically a modification of the second embodiment. Specifically, the third embodiment is similar to the second embodiment in that the plurality of look-up tables 12B1 to 12Bn for gray-scale data conversion is stored in the ejection-pattern memory 12B and that the head controller 12 is provided with the table-selector 12F for selecting one of the look-up tables 12Bi (i=1 to n).

On the other hand, the third embodiment is different from the second embodiment in that a random-number generator 12G for generating a random number in synchronization with each input of gray-scale data is provided. Based on the generated random number, one of the tables 12Bi (i=1 to n) for gray-scale data conversion is selected. In other words, according to the third embodiment, the selection of one table 12Bi is performed regardless of the position of each pixel.

Here, the random-number generator 12G may alternatively be a pseudo-random number generator as long as the output interval of the same values is long enough with respect to the drawing range.

Furthermore, it is preferable that the random numbers generated correspond to the number of the tables 12Bi (i=1 to n) provided. Alternatively, in a case where a larger amount of random numbers are to be generated, for example, an allocation to one of the tables can be performed by determining a residue group having modulo n, n being the number of tables provided.

3-2. Operation

The operation of the signal processing unit shown in FIG. 8 will now be described. First, the DSP 11 performs multi-level error diffusion on image data or text data to be drawn so as to produce gray-scale data of each pixel. The gray-scale data is then transferred to the PNM 12A in the head controller 12.

The PNM 12A then sends the gray-scale data to the table-selector 12F. Here, a random number generated by the random-number generator 12G is sent to the table-selector 12F. Based on the random number, the table-selector 12F selects one of the tables for gray-scale data conversion.

When the table for gray-scale data conversion is selected, the gray-scale data is applied to the table. Thus, an ejection pattern corresponding to the gray-scale data is read by the PNM 12A. This reading process is performed in the same manner as in the second embodiment. The process after the reading of the ejection pattern is performed in the same manner as in the first embodiment, and the description will thus be omitted.

3-3. Advantages of Third Embodiment

According to the signal processing unit of the third embodiment, the generated random number acts as a basis for selecting an appropriate look-up table for gray-scale data conversion. Consequently, different types of tables for gray-scale data conversion are used for every pixel. Similar to the second embodiment, various types of ejection patterns can be output according to the third embodiment even when data items of the same gray-scale level are input repeatedly. This achieves stable picture quality.

Embodiments of the present invention described below will be based on a technology of deflective-ejection of droplets. Examples of such a technology are described in detail in previous applications of the present applicant. Such applications are, for example, Japanese Patent Application No. 2002-320861, Japanese Patent Application No. 2002-320862, and Japanese Patent Application No. 2003-037343. Accordingly, redundant explanations of such a deflective-ejection technology will be omitted, and only the portions relevant to the present invention will be described below.

4. Fourth Embodiment

4-1. Circuit

A fourth embodiment according to the present invention will now be described.

Figure 11:
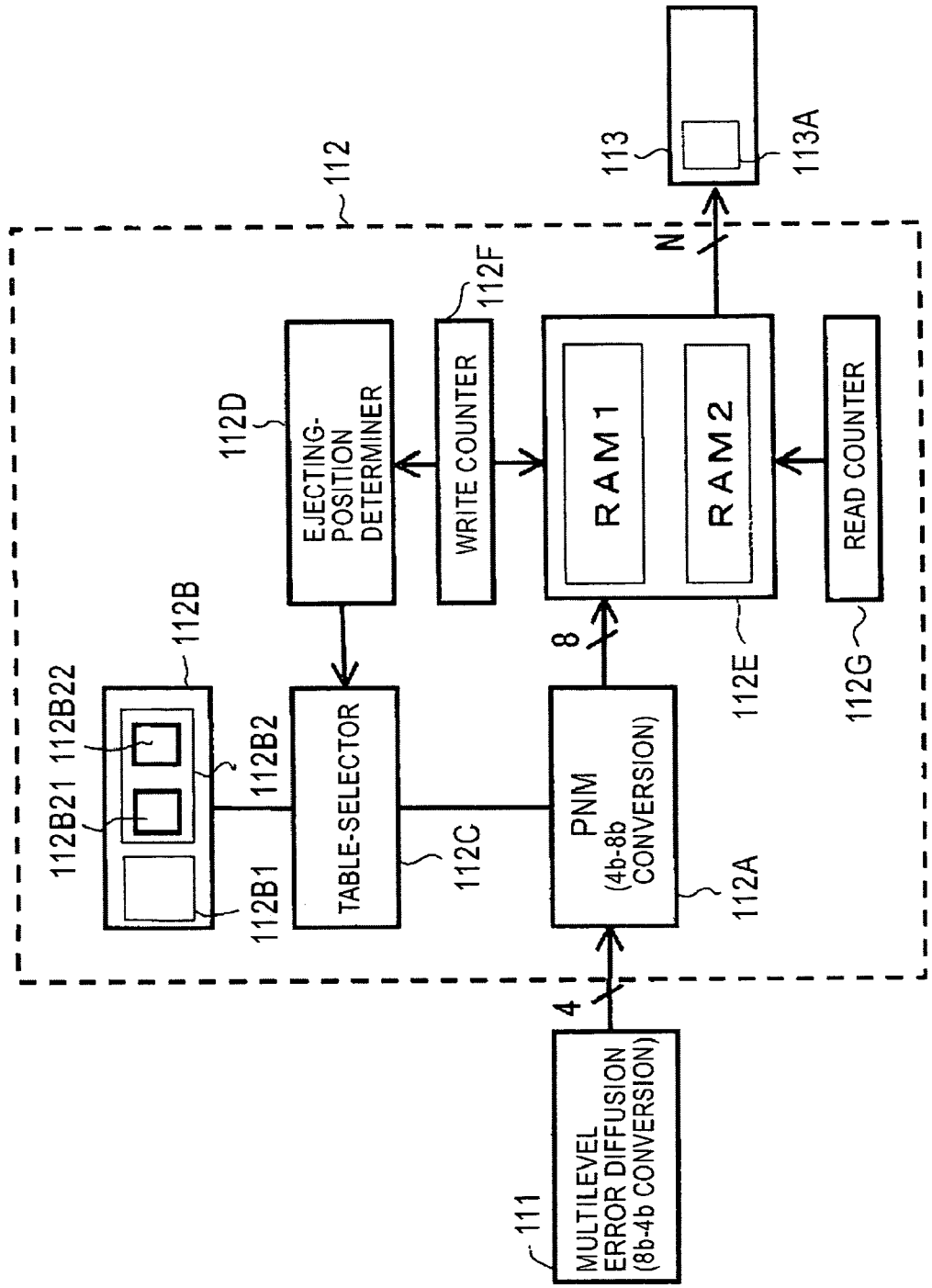
FIG. 11 illustrates a liquid-ejecting apparatus according to a fourth embodiment of the present invention.

FIG. 11 is a schematic diagram of a liquid-ejecting apparatus according to the fourth embodiment of the present invention. According to such a liquid-ejecting apparatus, the ejecting direction of droplets can be deflected by using electricity. Referring to FIG. 10, according to the fourth embodiment, the ejecting range of each nozzle covers two pixels. Moreover, the deflecting direction of each of the nozzles aligned on the line head is the same for all the nozzles.

In a single ejection sub-period, which is the minimum unit in a drawing period of each pixel, droplets are ejected in a deflective manner in the same direction from all nozzles or from a pair of nozzles. Moreover, in the fourth embodiment, the deflecting direction is alternately switched for every ejection sub-period.

The liquid-ejecting apparatus for performing such deflective ejection includes three main components, namely, a DSP 111, a head controller 112, and head chips 113. The DSP 111 performs multilevel error diffusion on image data so as to produce gray-scale data. In the fourth embodiment, the DSP 111 receives 8-bit image data and converts the 8-bit image data to 4-bit gray-scale data. The gray-scale data is then output from the DSP 111.

The gray-scale data includes information for determining the number of droplets to be ejected towards each pixel range. Accordingly, this technique in which each pixel is expressed with a group of droplets is called pulse number modulation. The value of the gray-scale data is determined based on the gray-scale level number to be expressed. In the fourth embodiment, one pixel may include a maximum of six droplets.

The head controller 112 converts the gray-scale data to corresponding ejection pattern data, and supplies the ejection pattern data to the corresponding head chip 113 at a predetermined timing. The head controller 112 includes a PNM 112A, an ejection-pattern memory 112B, a table-selector 112C, an ejecting-position determiner 112D, a buffer memory 112E, a write counter 112F, and a read counter 112G.

While referring to a table stored in the ejection-pattern memory 112B, the PNM 112A converts the gray-scale data to an appropriate ejection pattern. In the fourth embodiment, the PNM 112A converts 4-bit gray-scale data to 8-bit ejection pattern data.

The ejection pattern data is for determining the ejection timing of droplets. In detail, the ejection pattern data contains a series of ejection data bits for determining whether or not to eject droplets.

For example, an ejection data bit "1" indicates that a droplet is to be ejected, and an ejection data bit "0" indicates that no droplet is to be ejected. Thus, each ejection pattern data is given a sequence of numbers "0" and "1".

The length of each sequence corresponds to the number of ejection sub-periods included in a drawing period of one pixel. In the fourth embodiment, a drawing period of one pixel includes eight ejection sub-periods. In this case, the length of the sequence forming each ejection pattern is "8". Each ejection data bit is for determining whether or not to eject a droplet in the corresponding ejection sub-period.

Figure 12A:
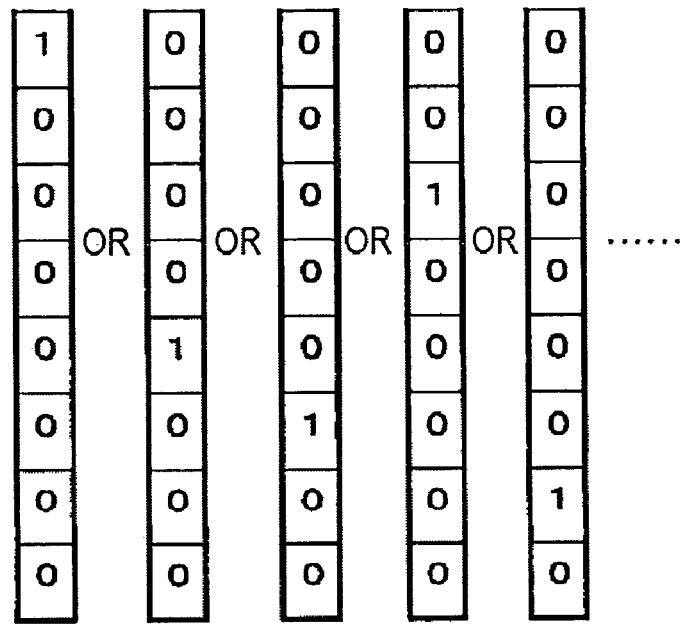
FIGS. 12A and 12B each illustrate a relationship between gray-scale data and corresponding ejection patterns.
Figure 12B:
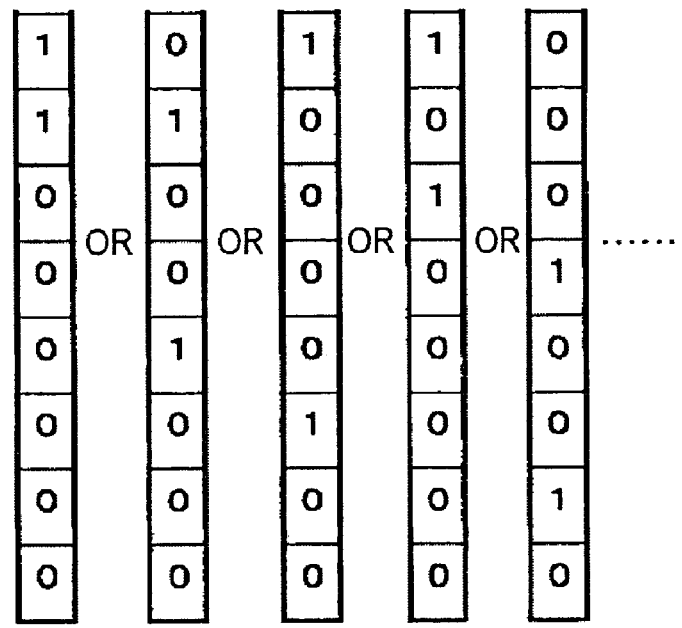

FIGS. 12A and 12B each illustrate an example of an ejection pattern. Specifically, FIG. 12A illustrates an ejection pattern PNM1 corresponding to a first gray-scale-level data item. In the ejection pattern PNM1, a droplet is to be ejected in one of the eight ejection sub-periods. There are eight possible types of patterns for the ejection pattern PNM1. The sub-period in which a droplet is to be actually ejected is determined based on whichever one of the possible patterns corresponds to the first gray-scale-level data item.

On the other hand, FIG. 12B illustrates an ejection pattern PNM2 corresponding to a second gray-scale-level data item. In the ejection pattern PNM2, droplets are to be ejected in two of the eight ejection sub-periods. There are 28 possible types of patterns for the ejection pattern PNM2. As shown in FIG. 12B, the ejection may be performed consecutively or non-consecutively. Moreover, the sub-periods in which droplets are to be actually ejected are determined based on whichever one of the possible patterns corresponds to the second gray-scale-level data item. The same applies for other gray-scale-level data items.

The ejection-pattern memory 112B stores multiple types of tables which function as correspondence between the gray-scale data and the ejection pattern data. According to the fourth embodiment, two types of tables are stored in the ejection-pattern memory 112B, namely, a table 112B1 for normal ejection and a table 112B2 for malfunction of ejection.

There is only one type of table 112B1 for normal ejection. In other words, for each gray-scale data, only one ejection pattern can be read from the table 112B1.

On the other hand, the table 112B2 includes ejection patterns that prevent an ejection data bit "1" from being given to a nozzle that is determined to be malfunctional. According to the fourth embodiment, since the ejecting direction can be deflected in two directions, the table 112B2 is provided with two types of table components 112B21 and 112B22.

The table component 112B21 is provided for nozzles that are determined to be malfunctional, and the table component 112B22 is provided for malfunction-related nozzles.

The term "malfunction-related nozzles" refers to nozzles which are adjacent to the malfunctional nozzles in the deflecting direction.

Figure 13:
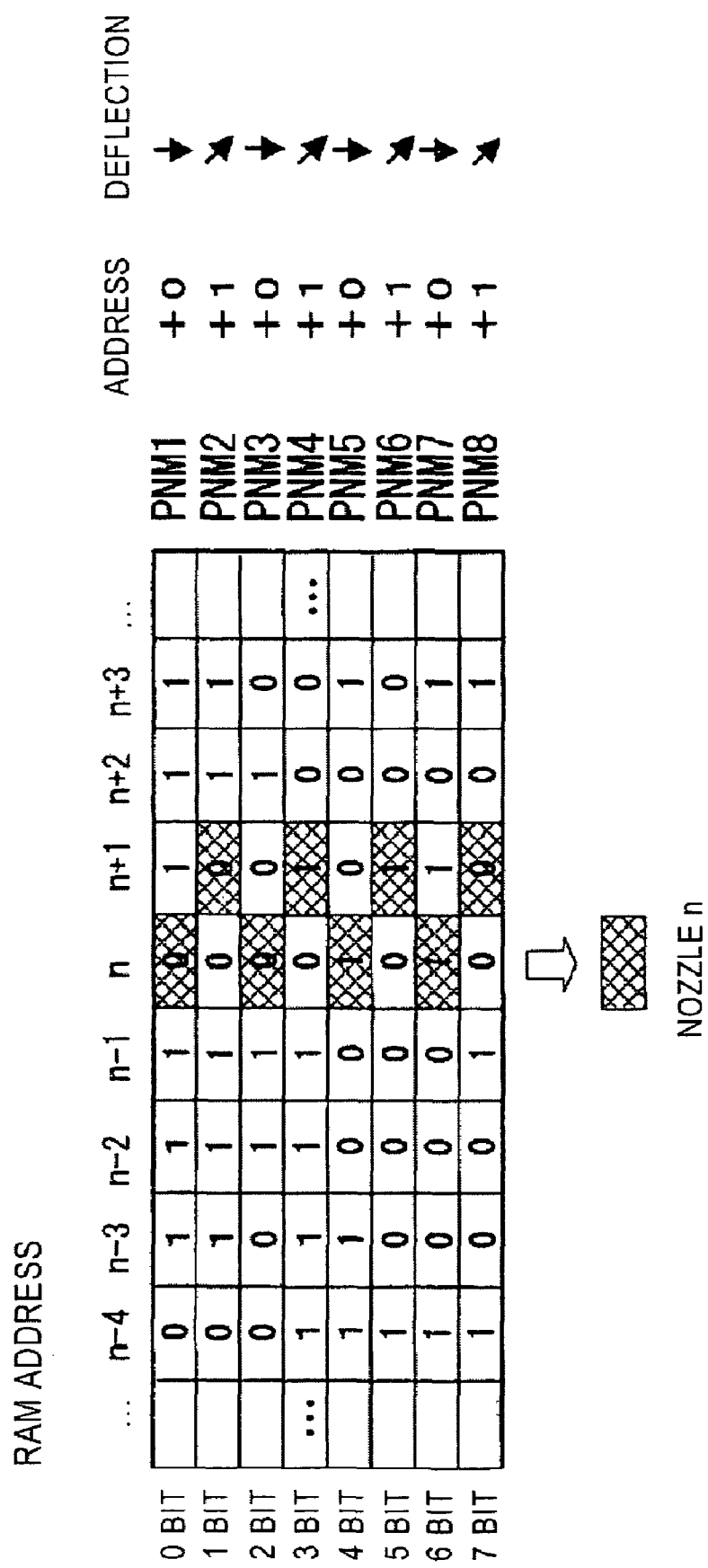
FIG. 13 is a diagram illustrating reading of ejection data bits in a case where droplets can be ejected in a deflective manner from two directions.

The relationship between the malfunctional nozzles and the malfunction-related nozzles will now be described with reference to FIGS. 13, 14A, and 14B. FIG. 13 illustrates a state where converted ejection pattern data is written in the buffer memory 112E. Each of the column addresses in FIG. 13 corresponds to one of the pixel ranges. For example, in a case where deflection control is not to be performed, droplets are ejected from a nozzle n corresponding to column address n based on an ejection pattern "00001010". On the other hand, the row addresses in FIG. 13 correspond to the eight ejection sub-periods.

Reference characters PNMi (i=1 to 8) in FIG. 13 each indicate an ejection pattern in the line direction for the corresponding ejection sub-period. Moreover, the arrows indicate the deflecting direction of ejection. The deflecting direction in FIG. 13 is equivalent to the deflecting direction shown in FIG. 10. Furthermore, reference numerals "+1" and "0" each indicate the shifting direction of a corresponding read address. Such values correspond to the deflecting direction, and the relationship between the values and the deflecting direction is shown in FIG. 10.

According to the fourth embodiment, each droplet ejected from the corresponding nozzle can be deflected. With respect to each nozzle, it is thus necessary to read an ejection pattern while taking into consideration the deflecting direction, as indicated by the shaded areas in FIG. 13. With respect to the nozzle n in FIG. 13, droplets are ejected based on an ejection pattern "00011110".

Thus, if the nozzle n is malfunctional, it is necessary to determine an ejection pattern for the corresponding pixel with respect to the gray-scale data such that the ejection data bits of all shaded areas are set at "0".

Figure 14A:
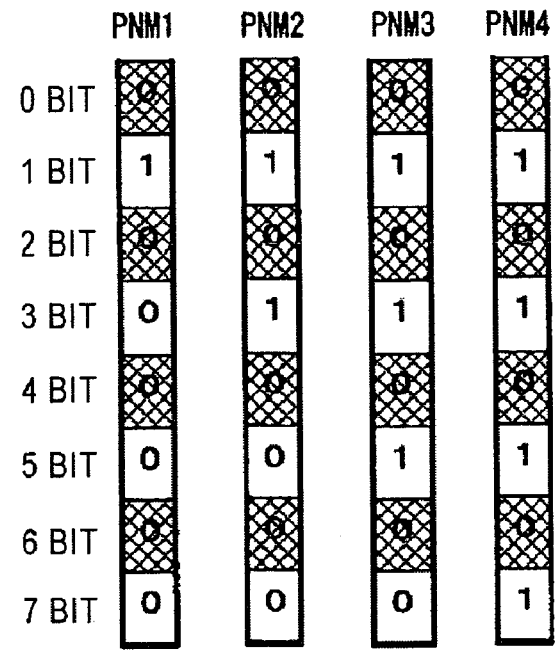
FIG. 14A illustrates a table for a malfunctional nozzle.
Figure 14B:
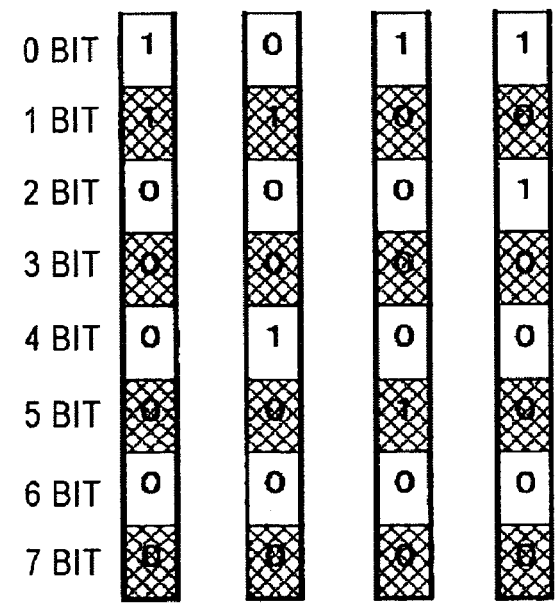
FIG. 14B illustrates a table for a malfunction-related nozzle.

FIGS. 14A and 14B illustrate examples of the table components for deflective ejection to compensate for malfunction of ejection. FIG. 14A corresponds to the table component 112B21 for nozzles that are determined to be malfunctional. FIG. 14B corresponds to the table component 112B22 for malfunction-related nozzles. Similar to FIG. 13, the shaded areas in FIGS. 14A and 14B each indicate an ejection sub-period for droplet-ejection from a nozzle n determined to be malfunctional. As is apparent from FIG. 14A, the ejection data bits in all shaded areas are set at "0". On the other hand, ejection data bits "1" are given to some sub-periods other than the shaded areas so that a gray-scale level corresponding to the gray-scale data can be expressed.

An ejection data bit "1" can be disposed in any position within a sub-period other than the shaded areas. In the fourth embodiment, an ejection data bit "1" may be disposed in any position within half of the eight ejection sub-periods, i.e. four sub-periods.

Accordingly, the period that can be used for gray-scale expression is limited to half the overall ejection sub-periods. For this reason, if the number of gray-scale data items exceeds such a number of the sub-periods, the number of gray-scale levels that can actually be expressed is limited to half the overall number of ejection sub-periods.

Generally, a read-only-memory (ROM) is used for the ejection-pattern memory 112B. Alternatively, a random-access-memory (RAM) or other semiconductor memory units may be used. In a case where a RAM is used, the tables can be freely rewritten. In other words, the ejecting positions can be changed to other desired positions. Furthermore, the ejection-pattern memory 112B may alternatively function as a storage medium that can be detached from the liquid-ejecting apparatus.

Based on the determination result by the ejecting-position determiner 112D, the table-selector 112C selects a corresponding table to be used by the PNM 112A. The determination result is used as information for determining whether the gray-scale data subject to conversion is intended for ejection through a normal nozzle or for ejection through a malfunction-related nozzle.

For example, in a case where the gray-scale data corresponds to a pixel that is not affected by malfunction of ejection, the table-selector 112C selects the table 112B1 for normal ejection. On the other hand, for example, if the gray-scale data corresponds to a pixel that is affected by malfunction of ejection, the table-selector 112C selects either the table component 112B21 or the table component 112B22 to compensate for the malfunction of ejection.

According to the fourth embodiment, the table component 112B21 is first selected, and the table component 112B22 is selected in the following input of subsequent gray-scale data. This is due to the fact that, according to the deflecting direction in the fourth embodiment, a nozzle determined to be malfunctional first appears and a nozzle affected by such malfunction of ejection appears afterwards. Consequently, if the deflecting direction is opposite to that in the fourth embodiment, the selection by the table-selector 112C correspondingly becomes opposite.

The selection between the two table components 112B21 and 112B22 can be done by, for example, a toggle switch. Such a switch is operated based on a determination result corresponding to the gray-scale data for a pixel affected by malfunction of ejection.

Furthermore, in a case where information regarding the malfunction of ejection is given in the determination result by the ejecting-position determiner 112D, the selection between the two table components 112B21 and 112B22 may be made based on such information. In such a case, a selection switch that operates based on the information may be provided.

Figure 15:
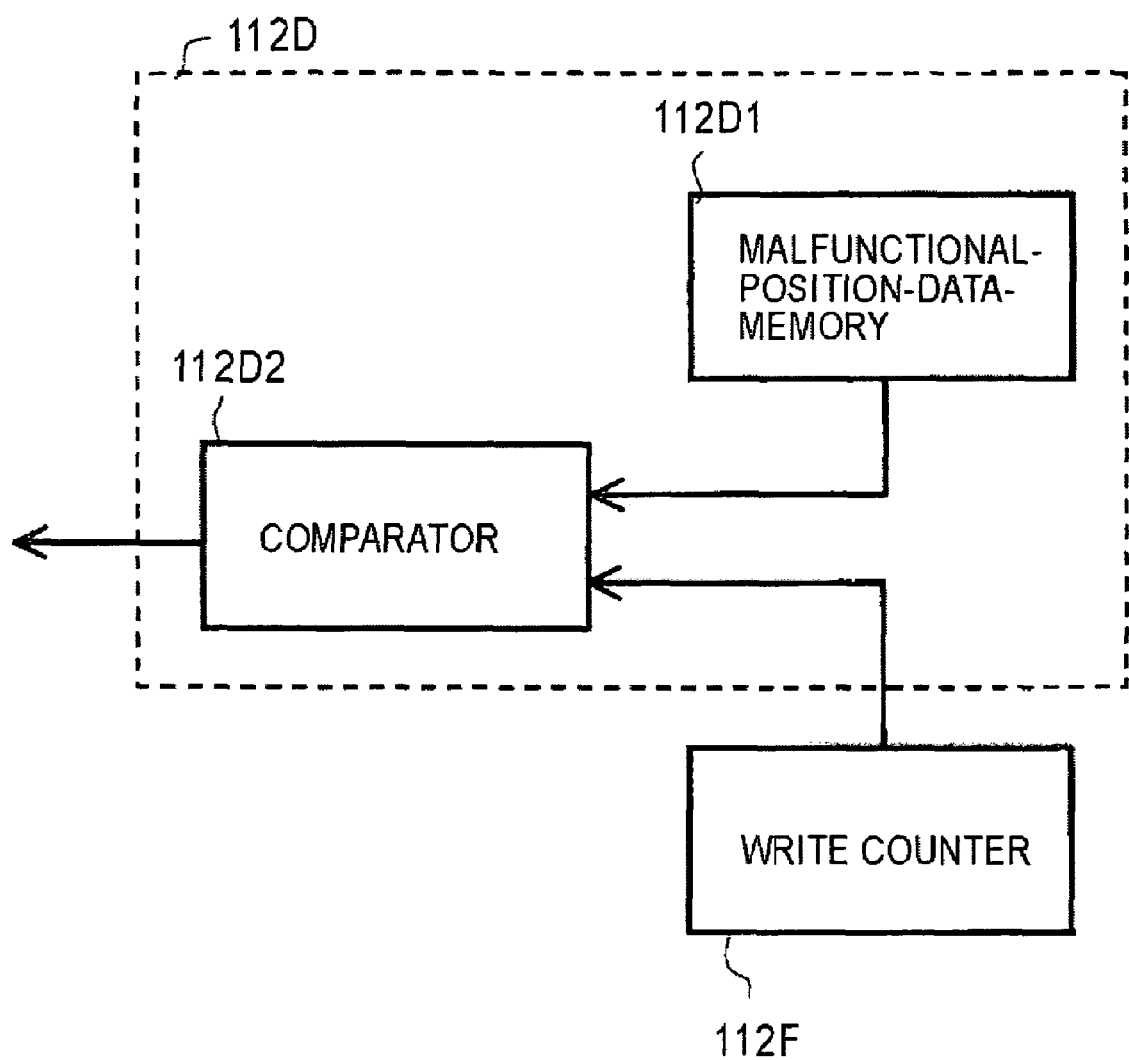
FIG. 15 is a schematic diagram of an ejecting-position determiner.

Based on a write address generated by the write counter 112F, the ejecting-position determiner 112D determines whether or not gray-scale data subject to conversion corresponds to a pixel affected by malfunction of ejection. FIG. 15 is a schematic diagram of the ejecting-position determiner 112D. The ejecting-position determiner 112D includes a malfunctional-position-data-memory 112D1 and a comparator 112D2. The malfunctional-position-data-memory 112D1 stores information regarding the positions of pixels facing nozzles determined to be malfunctional, and information regarding the positions of pixels affected by malfunction of ejection.

The comparator 112D2 compares the positional information generated by the write counter 112F with the malfunctional-position information. When the two positional information items correspond with each other, the comparator 112D2 determines that the corresponding gray-scale data is affected by malfunction of ejection. On the other hand, if the two positional information items do not correspond with each other, the comparator 112D2 determines that the gray-scale data corresponds to a pixel subject to normal drawing operation.

If the table-selector 112C determines that a predetermined number of gray-scale data items following the first determination input of the gray-scale data affected by the malfunction corresponds to pixels affected by malfunction of ejection, the malfunctional-position-data-memory 112D1 may store only the positional information of the pixel that can be read the quickest of all the pixels affected by the malfunction.

Accordingly, the table-selector 112C and the malfunctional-position-data-memory 112D1 may make an appropriate selection based on the processing content and the memory content of each other.

The positional information sent to the comparator 112D2 from the write counter 112F is an address of an ejection sub-period previous to the sub-period of the write address sent to the buffer memory 112E for determining the pixel position corresponding to the gray-scale data to be processed by the PNM 112A.

The buffer memory 112E is for temporarily storing ejection pattern data. The buffer memory 112E includes RAMs 1 and 2. The ejection data bit is read from and written to the RAMs 1 and 2. In other words, while one of the RAMs 1 and 2 performs a writing operation, the other performs a reading operation.

The write counter 112F generates a write address for the buffer memory 112E and positional information for the comparator 112D2. Based on the generated write address, the writing operation of ejection data bits is performed.

The read counter 112G generates a read address for the buffer memory 112E. Based on the generated read address, the reading operation of ejection data bits is performed. The reading operation of an ejection data bit is performed for each ejection sub-period.

Figure 16:
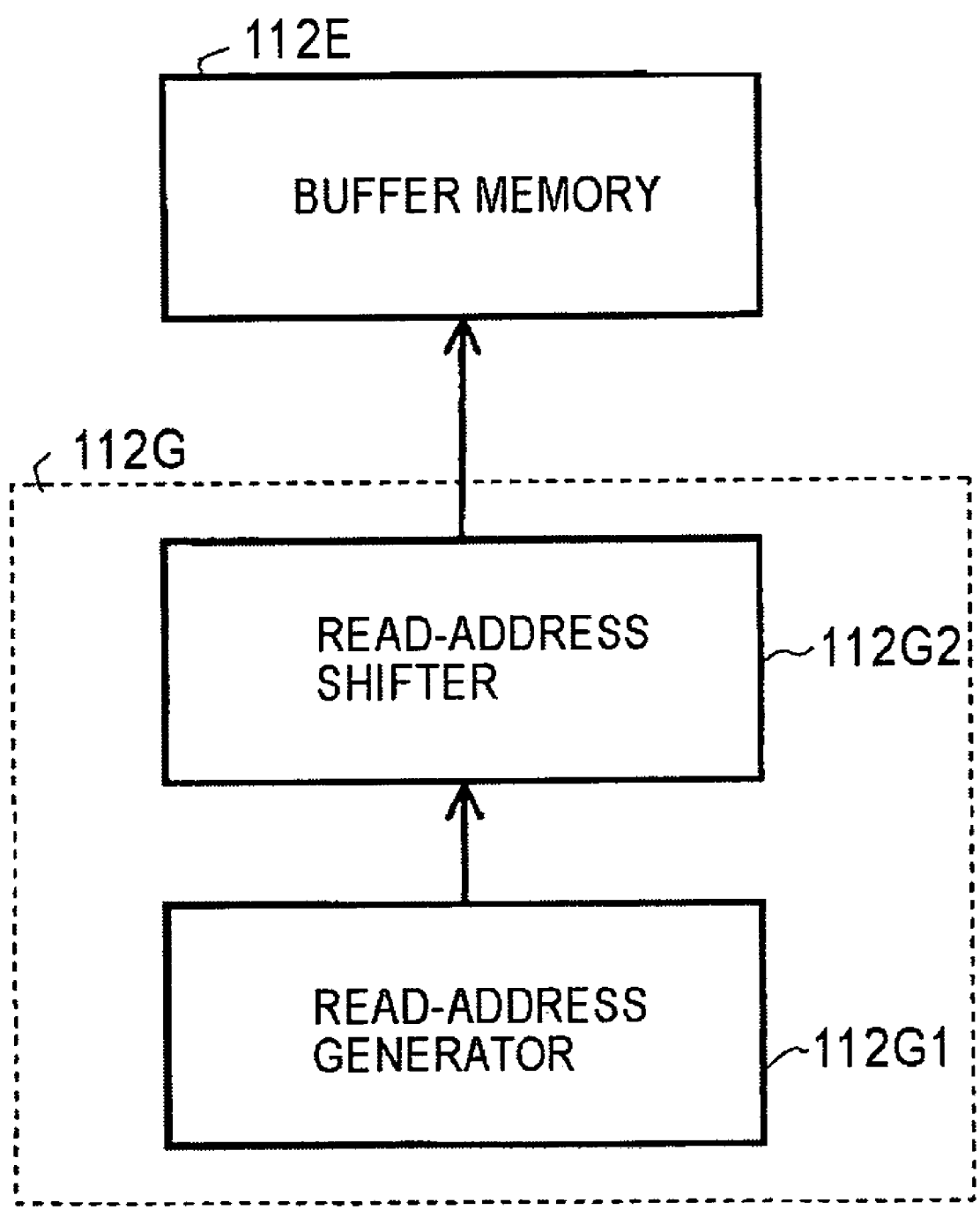
FIG. 16 is a schematic diagram of a read counter.

The read counter 112G must take into consideration the deflective ejection from a corresponding nozzle for generating a read address. FIG. 16 is a schematic diagram of the read counter 112G. As shown in FIG. 16, the read counter 112G includes a read-address generator 112G1 and a read-address shifter 112G2 for shifting the generated read address in the deflecting direction.

Figure 17:
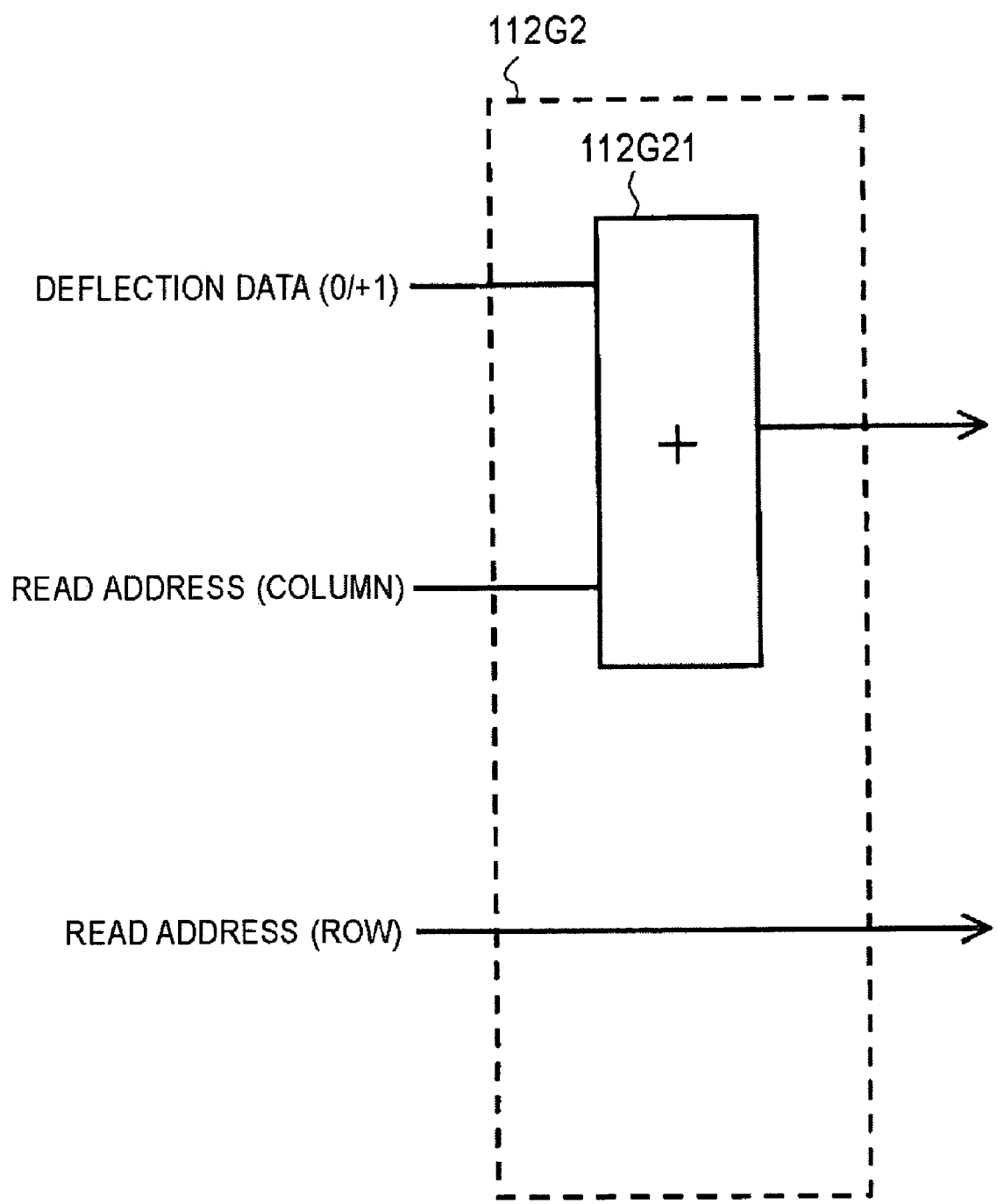
FIG. 17 is a schematic diagram of a read-address shifter.

The read-address shifter 112G2 adds an indication value for the deflecting direction to each column address in the read address input from the read-address generator 112G1. For example, if no deflection is required, an indication value "0" is added, whereas if deflection is required, an indication value "1" is added. The added result is sent to the table-selector 112C as a new column address. On the other hand, each row address is directly output to the table-selector 112C. FIG. 17 is a schematic diagram of the read-address shifter 112G2. An adder 112G21 is provided for transmitting each column address.

Like the shaded areas in FIG. 13, the ejection data bits are read from the buffer memory 112E in a zigzag manner.

Based on the read ejection data bits, each head chip 113 ejects droplets from the corresponding nozzles. The ejection of droplets is performed by an ejection driver 113A according to a droplet-ejecting method.

4-2. Operation

The operation of the liquid-ejecting apparatus shown in FIG. 11 will now be described. First, the DSP 111 performs multilevel error diffusion on 8-bit picture data, i.e. image data or text data. According to such multilevel error diffusion, the 8-bit picture data is converted to 4-bit gray-scale data.

The gray-scale data is sent to the table-selector 112C via the PNM 112A. Here, the ejecting-position determiner 112D determines whether the gray-scale data to be processed is affected or not affected by malfunction of ejection. The determination result is sent to the table-selector 112C.

According to the determination result, if the gray-scale data corresponds to a pixel to be drawn only through a normal nozzle, the table-selector 112C selects the table 112B1 and sends the read ejection pattern to the PNM 112A.

On the other hand, according to the determination result, if the gray-scale data corresponds to a pixel affected by malfunction of ejection, the table-selector 112C first selects the table component 112B21 and then reads a corresponding ejection pattern. In this case, the ejection pattern shown in FIG. 14A is read. Subsequently, the table-selector 112C selects the table component 112B22 and reads a corresponding ejection pattern. In this case, the ejection pattern shown in FIG. 14B is read.

Consequently, gray-scale data corresponding to a pixel to be drawn through a normal nozzle is converted to an ejection pattern by using the table 112B1 for normal ejection. On the other hand, gray-scale data corresponding to a pixel that is affected by malfunction of ejection is converted to an ejection pattern by using the table component 112B21 and the table component 112B22 for compensating for the malfunction of ejection.

Accordingly, for a malfunctional nozzle, an ejection pattern whose ejection data bits are all set at "0" is read from the buffer memory 112E. Moreover, for a subsequent nozzle following the malfunctional nozzle, an ejection pattern that maintains the gray-scale level of the pixel corresponding to the gray-scale data is read.

Accordingly, as long as malfunctional nozzles do not continue in a repeated manner, droplets can be ejected so as to compensate for such malfunction of ejection. As a result, the gray-scale level can be properly expressed.

Figure 18:
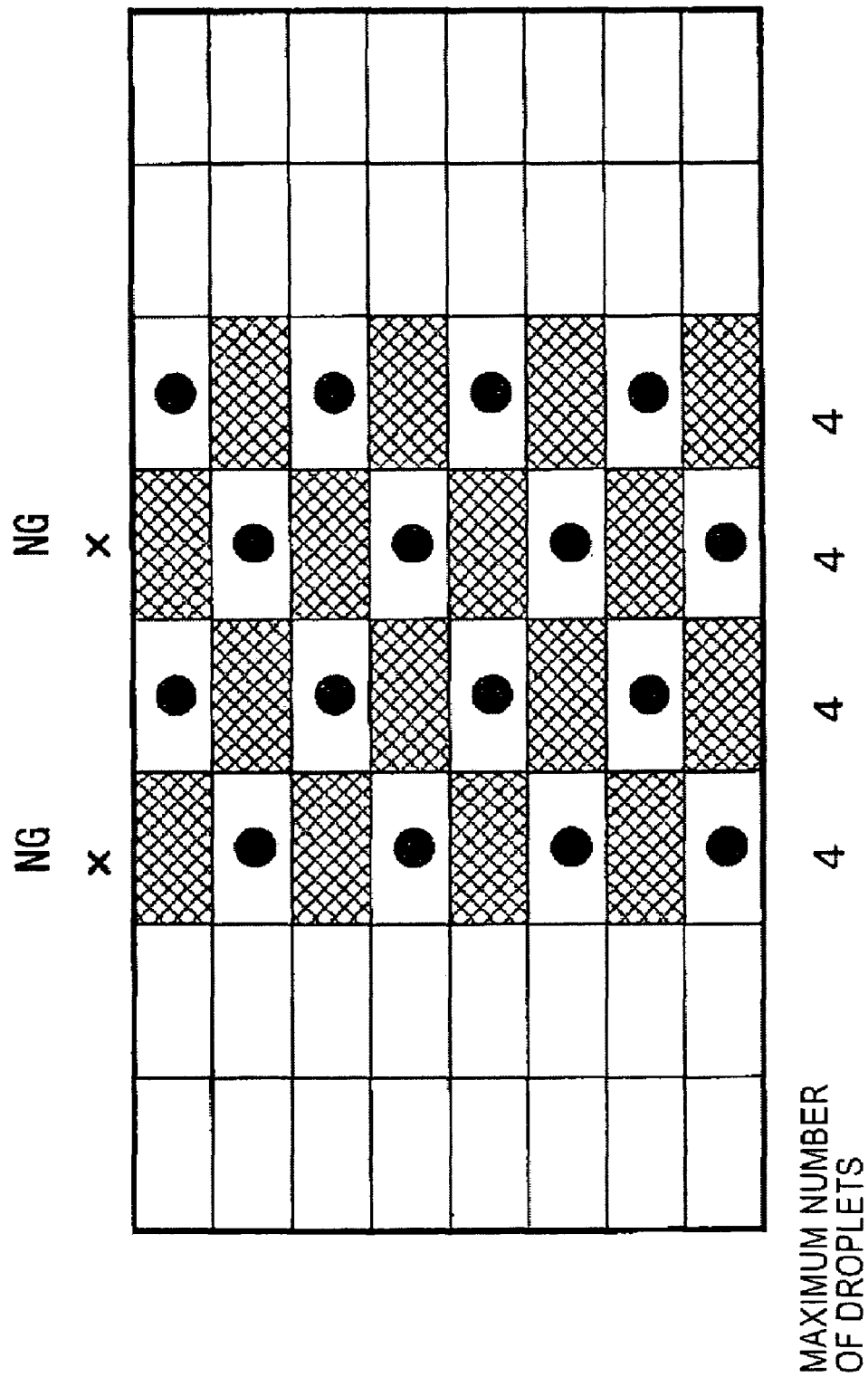
FIG. 18 illustrates an example in which every other nozzle is malfunctional.

FIG. 18 illustrates an example in which the droplet ejection can be deflected in two directions. In this case, one pixel can be drawn through two nozzles. In FIG. 18, every other nozzle in the line direction is determined to be malfunctional.

Referring to FIG. 18, each position of a malfunctional nozzle is indicated by an "x". Moreover, the shaded areas indicate ejection data bits to be read by the malfunctional nozzles. Each shaded area is given an ejection data bit "0". In this case where every other nozzle is malfunctional, four pixels can be drawn, each with a maximum of four droplets, as indicated by circular dots in the drawing. The ejected position of the droplets in this case is accurate. Accordingly, if the maximum value of the gray-scale data is four, there is no deterioration of the picture quality. Furthermore, even if the maximum value of the gray-scale data exceeds the value four, a picture having a substantially equivalent gray-scale can be achieved.

Figure 19:
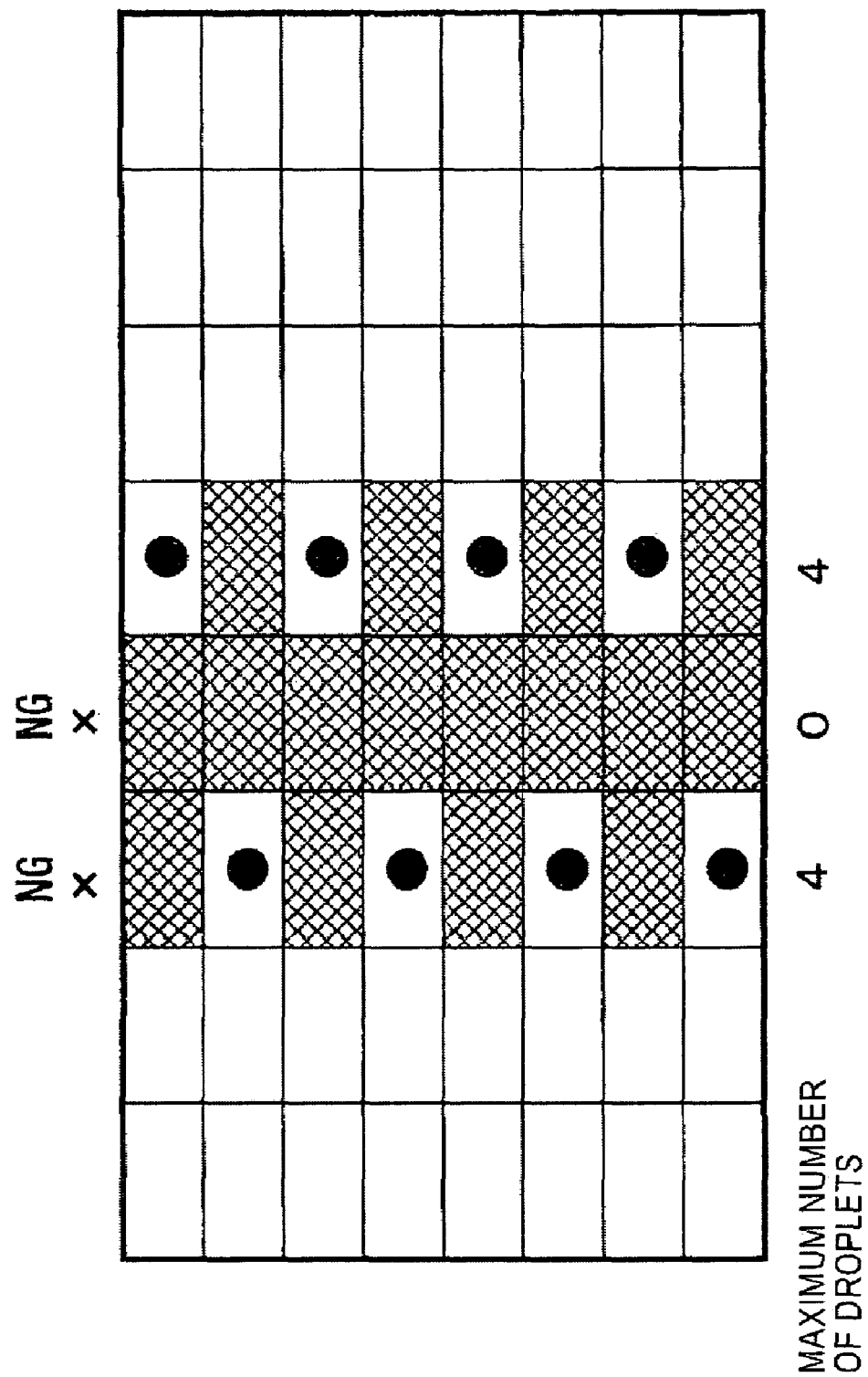
FIG. 19 illustrates an example in which adjacent nozzles are malfunctional.

Another example will be described with reference to FIG. 19. The example in FIG. 19 is similar to the above example in that the droplet ejection can be deflected in two directions. The difference is that the malfunctional nozzles continue in the line direction in a repeated manner. In this case, the same compensation process as in the example in FIG. 18 can be performed for the two outer pixels of the three consecutive pixels. In other words, if the maximum value of the gray-scale data is four, there is no deterioration of the picture quality.

However, the pixel in the middle cannot be compensated for since the ejection data bits for all the sub-periods are set at "0".

4-3. Advantages of Fourth Embodiment

According to the liquid-ejecting apparatus of the fourth embodiment, even if some of the nozzles are malfunctional, due to ejection inability or deviation, for example, droplets can still be ejected to an accurate position to achieve the proper gray-scale.

5. Fifth Embodiment 5-1. Circuit

Figure 20:
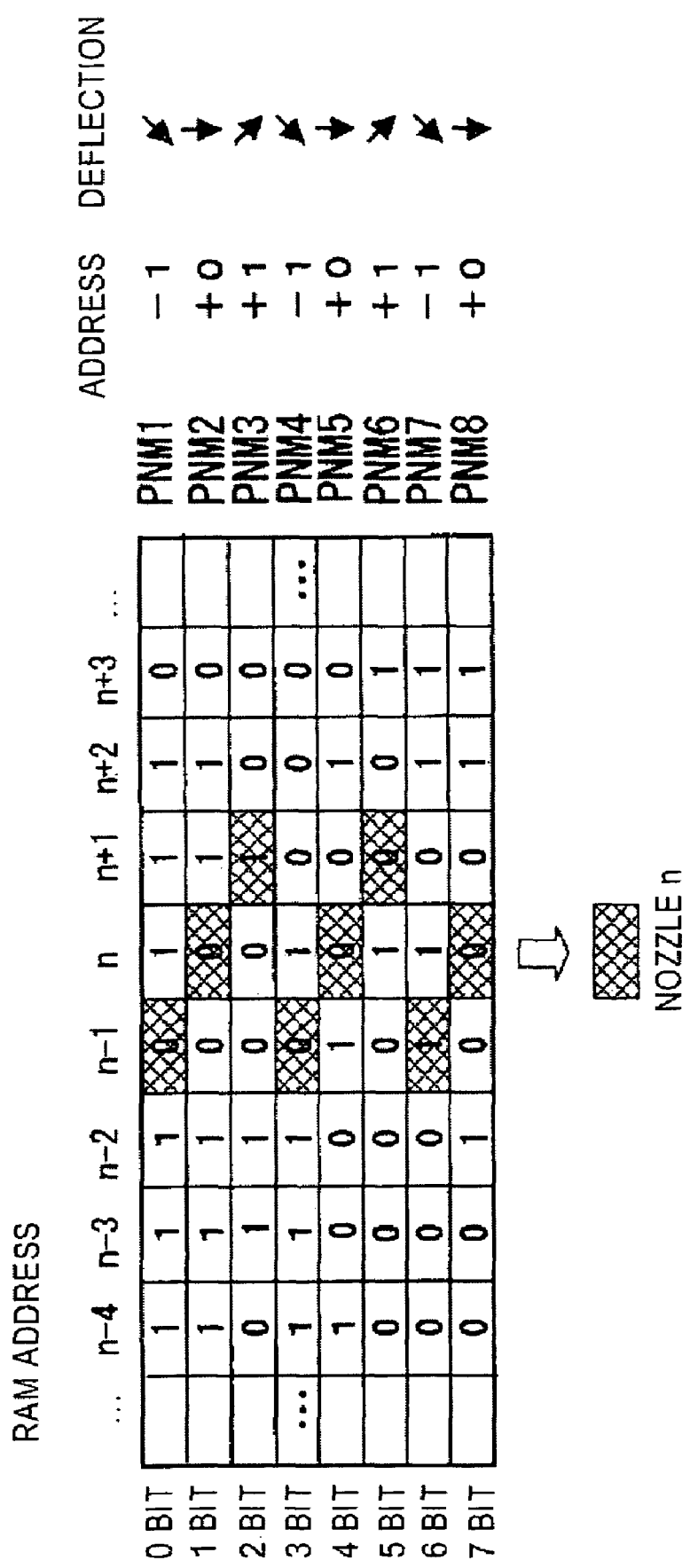
FIG. 20 is a diagram in which ejection data bits are read such that droplets can be deflectively ejected from three directions.

Referring to FIG. 20, a fifth embodiment of the present invention is an example in which droplets can be deflected in three directions, namely, the forward direction, the right direction, and the left direction.

The basic structure of the fifth embodiment is the same as that of the fourth embodiment. The read-address shifter 112G2 adds values "−1, 0, +1, −1, 0, +1, −1, 0" to the corresponding column addresses of the read addresses generated by the read-address generator 112G1 so that the droplets can be ejected in the directions "left-forward-right-left-forward-right-left-forward".

To perform such deflection control for an n-th nozzle in FIG. 20, it is necessary to read an ejection pattern in which the ejection data bits correspond to the shaded areas. In other words, it is necessary to read an ejection pattern "00100010".

As described previously, if the n-th nozzle can function properly, there is no problem in using such an ejection pattern. However, if the n-th nozzle is determined to be malfunctional, all the ejection data bits in the shaded areas must be set at "0".

FIGS. 21A, 21B, and 21C each illustrate a table 112B2 for malfunction of ejection, which is a distinctive feature of the fifth embodiment. The table 112B2 includes three types of table components, namely, a table component 112B21, a table component 112B22, and a table component 112B23.

The table component 112B21 is for pixels facing malfunctional nozzles. Referring to FIG. 21B, an example of the table component 112B21 is illustrated. In this example, ejection data bits "0" are provided in sub-periods in which droplets are to be ejected to an n-th pixel through a malfunctional nozzle. Specifically, the ejection data bits in row addresses of the first, fourth, and seventh bits are set at "0".

Accordingly, the gray-scale expression corresponding to each gray-scale-level data item PNMi (i=1, 2, 3, 4, or 5) is achieved by using the unshaded areas in the drawing. In the case of FIG. 21B, the droplet-ejection corresponding to the gray-scale-level data item PNM1 is set at the 0-th bit of the row address.

In such a case, since there are five unshaded areas in each data item, the gray-scale expression can be properly achieved with up to a maximum of five droplets.

The two remaining table components 112B22 and 112B23 will now be described. The table component 112B22 is for an (n+1)th pixel affected by malfunction of ejection. Referring to FIG. 21C, an example of the table component 112B22 is illustrated. In this example, ejection data bits "0" are provided in sub-periods in which droplets are to ejected to an (n+1)th pixel through a malfunctional nozzle. Specifically, the ejection data bits in row addresses of the second and fifth bits are set at "0".

In this case, the gray-scale expression corresponding to each gray-scale-level data item PNMi (i=1, 2, 3, 4, or 5) is achieved by using the unshaded areas in the drawing. In the case of FIG. 21C, the droplet-ejection corresponding to the gray-scale-level data item PNM3 is performed at the 0-th bit, the first bit, and the third bit of the row addresses. Since there are six unshaded areas in each data item, the gray-scale expression can be properly achieved with up to a maximum of six droplets.

On the other hand, the table component 112B23 is for an (n−1)th pixel affected by malfunction of ejection. Referring to FIG. 21A, an example of the table component 112B23 is illustrated. In this example, ejection data bits "0" are provided in sub-periods in which droplets are to ejected to an (n−1)th pixel through a malfunctional nozzle. Specifically, the ejection data bits in row addresses of the 0-th bit, the third bit, and the sixth bit are set at "0".

In this case, the gray-scale expression corresponding to each gray-scale-level data item PNMi (i=1, 2, 3, 4, or 5) is achieved by using the unshaded areas in the drawing. In the case of FIG. 21A, the droplet-ejection corresponding to the gray-scale-level data item PNM2 is performed at the first and second bits of the row addresses. Since there are five unshaded areas in each data item, the gray-scale expression can be properly achieved with up to a maximum of five droplets.

5-2. Operation

The operation of the liquid-ejecting apparatus according to the fifth embodiment will now be described. The operation according to the fifth embodiment is basically the same as the fourth embodiment.

First, the DSP 111 performs multilevel error diffusion on 8-bit picture data, i.e. image data or text data. According to such multilevel error diffusion, the 8-bit picture data is converted to 4-bit gray-scale data.

The gray-scale data is sent to the table-selector 112C via the PNM 112A. Here, the ejecting-position determiner 112D determines whether the gray-scale data to be processed corresponds to a pixel to be drawn only with a normal nozzle or to a pixel that is affected by malfunction of ejection. The determination result is sent to the table-selector 112C.

According to the determination result, if the gray-scale data corresponds to a pixel to be drawn only through a normal nozzle, the table-selector 112C selects the table 112B1 and sends the read ejection pattern to the PNM 112A.

On the other hand, according to the determination result, if the gray-scale data corresponds to a pixel affected by malfunction of ejection, the table-selector 112C first selects the table component 112B23 and then reads a corresponding ejection pattern. In this case, the ejection pattern shown in FIG. 21A is read.

Subsequently, the table-selector 112C selects the table component 112B21 and reads a corresponding ejection pattern. In this case, the ejection pattern shown in FIG. 21B is read. Then, the table-selector 112C selects the table component 112B22 and reads a corresponding ejection pattern. In this case, the ejection pattern shown in FIG. 21C is read.

Consequently, gray-scale data corresponding to a pixel to be drawn through a normal nozzle is converted to an ejection pattern by using the table 112B1 for normal ejection. On the other hand, gray-scale data corresponding to a pixel to be drawn originally through a malfunctional nozzle is converted to an ejection pattern by using the three table components 112B21 to 112B23 for compensating for the malfunction of ejection.

Accordingly, for a malfunctional nozzle, an ejection pattern whose ejection data bits are all set at "0" is read from the buffer memory 112E. Moreover, for each nozzle adjacent to the malfunctional nozzle, an ejection pattern that maintains the gray-scale level of the pixel corresponding to the gray-scale data is read.

Accordingly, if malfunctional nozzles do not continue in a repeated manner, droplets can be ejected so as to compensate for such malfunction of ejection. As a result, the gray-scale level can be properly expressed. FIG. 22 illustrates an example in which the droplet ejection can be deflected in three directions. In this case, one pixel can be drawn through three nozzles. In FIG. 22, two nozzles in the line direction are determined to be malfunctional, the two malfunctional nozzles having two normal nozzles therebetween.

Referring to FIG. 22, each position of a malfunctional nozzle is indicated by an "x". Moreover, the shaded areas indicate ejection data bits to be read by the malfunctional nozzles. Each shaded area is given an ejection data bit "0".

In this case where two malfunctional nozzles have two normal nozzles therebetween, six pixels can be drawn, each with a maximum of five or six droplets, as indicated by circular dots in the drawing. The ejected position of the droplets in this case is accurate. Accordingly, if the maximum value of the gray-scale data is five, there is no deterioration of the picture quality in these six pixels. Furthermore, even if the maximum value of the gray-scale data exceeds the value five, the gray-scale expression with six droplets is still possible for some of the pixels, thus achieving high picture quality.

Another example will be described with reference to FIG. 23. The example in FIG. 23 is similar to the above example in that the droplet ejection can be deflected in three directions. The difference is that every other nozzle in the line direction is determined to be malfunctional. In this case, the same compensation process as in the example in FIG. 22 can be performed for the five consecutive pixels. However, for the pixel in the center, only a maximum of three droplets can be ejected to the pixel range to prevent the number of non-ejecting sub-periods from doubling.

The other pixel ranges can still be expressed with a maximum of five or six droplets, thus maintaining high picture quality.

Figure 24:
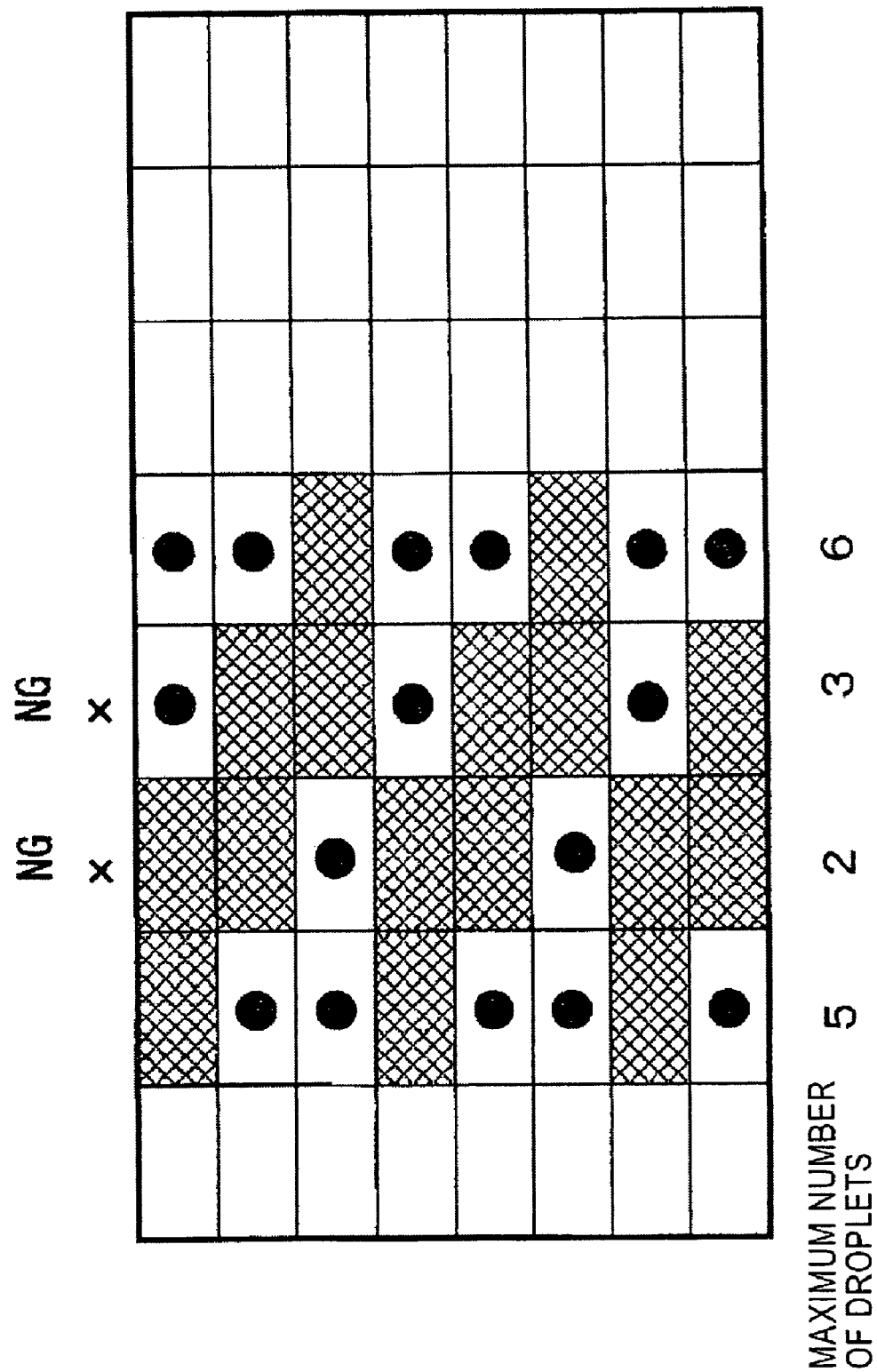
FIG. 24 illustrates an example in which adjacent nozzles are malfunctional.

Another example will be described with reference to FIG. 24. The example in FIG. 24 is similar to the above examples in that the droplet ejection can be deflected in three directions. The difference is that the malfunctional nozzles continue in the line direction in a repeated manner. In this case, a compensation process can be performed for four consecutive pixels. However, only two outer pixels of the four consecutive pixels can achieve the gray-scale expression equivalent to the other examples. The two outer pixels can be expressed with a maximum of five or six droplets.

However, because of the non-ejecting sub-period, only a maximum of two or three droplets can be ejected to the two inner pixels. In comparison with a case where no droplet-ejection is allowed or a case where a droplet is ejected to a wrong position, the example in FIG. 24 can still allow droplets to be ejected to their proper positions and minimally keep the picture quality from deteriorating.

On the other hand, if the maximum value of the gray-scale data corresponding to these pixel ranges is two, the desired gray-scale expression can be accurately achieved.

5-3. Advantages of Fifth Embodiment

According to the liquid-ejecting apparatus of the fifth embodiment, even if some of the nozzles are determined to be malfunctional, due to ejection inability or deviation, for example, droplets can still be ejected to an accurate position to achieve the proper gray-scale level.

6. Sixth Embodiment

A sixth embodiment is an example in which droplets can be deflected in four or more directions. Similar to the above embodiments, by providing a sufficient number of table components for malfunctional nozzles to perform deflective ejection, the malfunction of ejection can be compensated for. In other words, such compensation can be achieved by ejecting droplets to each pixel range from four or more directions.

7. Seventh Embodiment 7-1. Circuit

Figure 25:
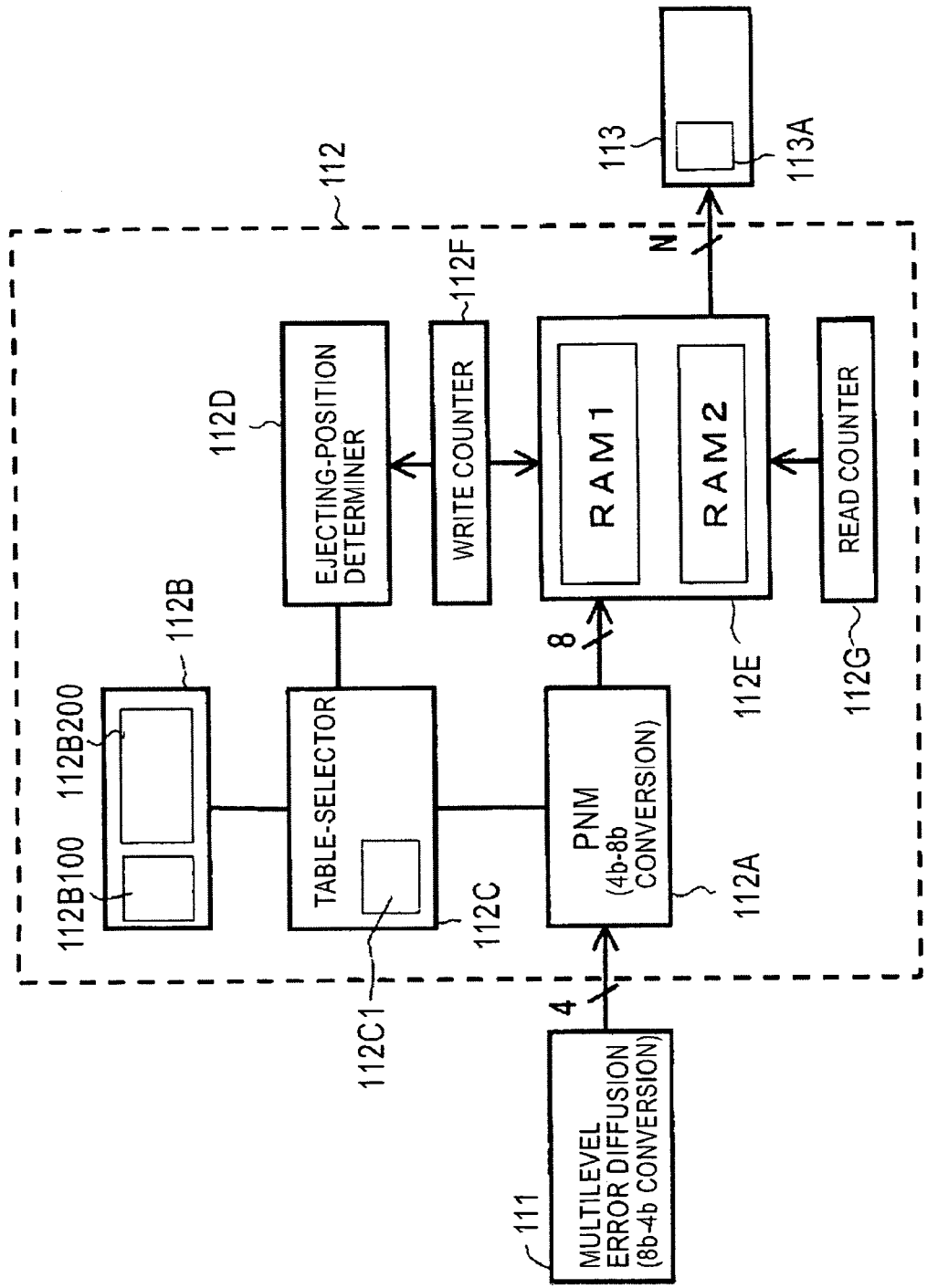
FIG. 25 illustrates a liquid-ejecting apparatus according to a seventh embodiment of the present invention.

FIG. 25 is a schematic diagram of a liquid-ejecting apparatus according to a seventh embodiment of the present invention. The structure and operation of such a liquid-ejecting apparatus of the seventh embodiment are basically the same as those of the above embodiments.

Figure 26:
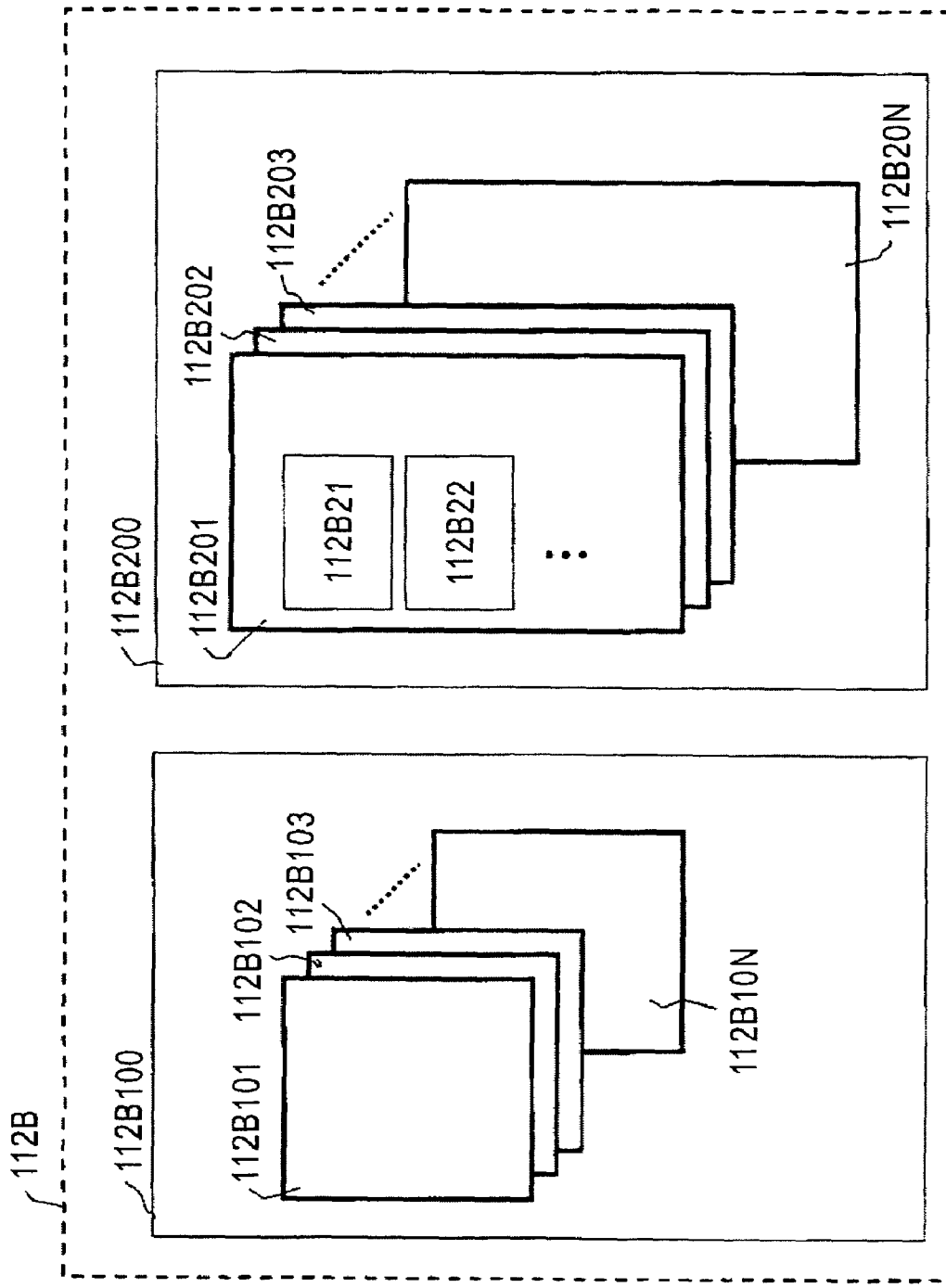
FIG. 26 illustrates a table for normal ejection and a table for malfunction-related ejection, each of the tables being provided with a set of selectable table components.

Referring to FIG. 26, the distinctive feature of the seventh embodiment is that a table 112B100 for normal ejection and a table 112B200 for malfunction-related ejection are provided. Moreover, the table 112B100 includes a set of table components 112B101 to 112B10N, and the table 112B200 includes a set of table components 112B201 to 112B20N.

Each of the table components 112B101 to 112B10N corresponds to the table 112B1 in the fourth embodiment, and each of the table components 112B201 to 112B20N corresponds to the table 112B2 in the fourth embodiment. In the seventh embodiment, the table-selector 112C selects one of the table components in each set. The same processes as in the above embodiments are performed for the selected table component 112B10$i$ ($i$=1 to N) and table component 112B20$j$ ($j$=1 to N).

The table components 112B101 to 112B10N for normal ejection are different from one another. In detail, each table component has at least one correspondence relationship between a gray-scale-level data item and an ejection pattern different from another table. The same applies for the table components 112B201 to 112B20N for malfunction-related ejection.

In the seventh embodiment, the table components 112B101 to 112B10N and the table components 112B201 to 112B20N are switched in a random manner for every pixel. Consequently, even if the same type of gray-scale data is input, the gray-scale data is converted to a different type of ejection pattern. According to this method, even when the same type of gray-scale data is input in a consecutive manner, the ejecting positions (or the ejection timing) are distributed in a discrete manner. This achieves, for example, smoother refilling of liquid after each droplet ejection process, and moreover, prevents the droplet ejection from being adversely affected by vibration of the housing of the liquid-ejecting apparatus.

The selecting of the table components is performed by the table-selector 112C. In the seventh embodiment, a random-number generator 112C1 is provided. A random number generated by the random-number generator 112C1 is used as a basis for selecting one of the table components.

Alternatively, a table may be provided in the table-selector 112C for selecting one of the table components 112B101 to 112B10N and one of the table components 112B201 to 112B20N. In this case, the table in the table-selector 112C functions as a correspondence between a position of a pixel and one of the table components 112B101 to 112B10N, and between a position of a pixel and one of the table components 112B201 to 112B20N. Thus, the table-selector 112C can select a different table component corresponding to the position of every pixel.

Similar to the above embodiments, the positional information of each pixel may be input from the write counter 112F. Just for reference, examples of the table used for the selection of the table components are illustrated FIGS. 27A and 27B. FIG. 27A illustrates an example in which the table is formed of basic table units each composed of two rows by two columns. On the other hand, FIG. 27B illustrates an example in which the table is formed of basic table units each composed of three rows by three columns.

7-2. Operation

The operation of the liquid-ejecting apparatus shown in FIG. 25 will now be described. First, the DSP 111 performs multilevel error diffusion on 8-bit picture data, i.e. image data or text data. According to such multilevel error diffusion, the 8-bit picture data is converted to 4-bit gray-scale data.

The gray-scale data is sent to the table-selector 112C via the PNM 112A. Here, the ejecting-position determiner 112D determines whether the gray-scale data to be processed corresponds to a pixel to be drawn only with a normal nozzle or to a pixel that is affected by malfunction of ejection. The determination result is sent to the table-selector 112C.

Simultaneously, based on a random number generated by the random-number generator 112C1, the table-selector 112C selects a table component 112B10$i$ (i=1 to N) and a table component 112B20$j$ (j=1 to N) for gray-scale data conversion. Alternatively, two random numbers may be generated such that one corresponds to the table component for normal ejection and the other corresponds to the table component for malfunction of ejection. In the case of the seventh embodiment, a single random number is used as a basis for selecting one of the table components for normal ejection and one of the table components for malfunction of ejection.

After the selection of the table components, the table-selector 112C chooses one of the selected table components as a reference based on the determination result so as to read an appropriate ejection pattern corresponding to the gray-scale data. As described previously, the read ejection pattern is written into the buffer memory 112E via the PNM 112A.

In such a case, for a malfunctional nozzle, an ejection pattern whose ejection data bits are all set at "0" is read. Moreover, for each of nozzles adjacent to the malfunctional nozzle, an ejection pattern that maintains the gray-scale level of the pixel corresponding to the gray-scale data is read.

7-3. Advantages of Seventh Embodiment

In addition to the advantages of the above embodiments, the seventh embodiment advantageously prevents uneven use of the ejection patterns.

This prevents deterioration of picture quality caused by incomplete refilling of liquid after each droplet ejection process. Moreover, even if the ejecting direction is deviated due to vibration of the housing, the seventh embodiment prevents the deviated spots from being noticeable since the ejecting positions are discretely distributed.

The present invention described above can be applied to a printer head that ejects ink droplets. Furthermore, the present invention can also be applied to a signal processing circuit of the printer head. Moreover, the present invention can also be applied to a printer having a printer head and to other electrical devices. The object to be drawn upon by using the printer is not limited to paper, and may alternatively be other materials, such as a plastic material or a metallic material. Furthermore, the present invention can also be applied to an inspection device that ejects test samples as droplets.

What is claimed is:

1. An ejection control device comprising:
   a memory for storing multiple tables providing a correlation between gray-scale data items and ejection pattern data items, each gray-scale data item determining the number of droplets to be ejected to a corresponding pixel so as to express a desired gray-scale level of the pixel, each ejection pattern data item determining the ejection timing of droplets;
   a selector for selecting one of the tables; and
   ejecting ink from at least one ink ejection chamber based on data from the selected table.

2. The ejection control device according to claim 1, wherein the selector selects one of the tables based on a position of a pixel that is to be processed.

3. The ejection control device according to claim 1, wherein the selector selects one of the tables based on a random number.

4. The ejection control device according to claim 1, wherein each table includes at least one ejection pattern data item in which information concerning ejection timing of droplets is non-consecutive.

5. The ejection control device according to claim 1, wherein the memory is rewritable such that a content of each table can be changed.

6. A liquid-ejecting apparatus comprising:
   a memory storing multiple tables providing a correlation between grayscale data and ejection pattern data, the gray-scale data determining a number of droplets to be ejected to a corresponding pixel so as to express a desired gray-scale level for the pixel, the ejection pattern data determining an ejection timing of droplets;
   a selector for selecting one of the tables; and
   an ejection driver for ejecting droplets through a corresponding nozzle based on the ejection pattern data.

7. A method for controlling an ejecting operation, comprising the steps of:
   selecting one of multiple tables providing a correlation between gray-scale data items and ejection pattern data items, each gray-scale data item determining the number of droplets to be ejected to a corresponding pixel so as to express a desired gray-scale level of the pixel, each ejection pattern data item determining the ejection timing of droplets; and
   converting each gray-scale data item of the corresponding pixel to the corresponding ejection pattern data item by referring to the selected table.

8. A recording medium having recorded thereon a program implemented by a processor wherein
   the program uses multiple types of correspondence tables providing correspondence between gray-scale data items and ejection pattern data items, each gray-scale data item determining the number of droplets to be ejected to a corresponding pixel so as to express a desired grayscale level of the pixel, each ejection pattern data item determining the ejection timing of droplets, whereby the computer converts each gray-scale data item of the corresponding pixel to the corresponding ejection pattern data item by referring to the selected table.

9. A program controlling a computer to provide a correspondence table between gray-scale data and ejection pattern data, the gray-scale data determining a number of droplets to be ejected to a corresponding pixel so as to express a desired gray-scale level of the pixel, each ejection pattern determining the ejection timing of droplets, whereby the computer converts each gray-scale data item of the corresponding pixel to the corresponding ejection pattern data item based on the table.

10. A program enabling a processor controlled device to select one of multiple correspondence tables between gray-scale data items and ejection pattern data items, each gray-scale data item determining a number of droplets to be ejected to a corresponding pixel so as to express a desired grayscale level of the pixel, the ejection pattern data determining the ejection timing of droplets, whereby the computer converts each gray-scale data item of the corresponding pixel to the corresponding ejection pattern data item by referring to the selected table.

11. An ejection control device for controlling ejection of droplets for a liquid-ejecting apparatus provided with an ejection head, the ejection head having nozzles each being capable of ejecting droplets to multiple pixel ranges by deflection of the droplets, the ejection control device comprising:
 a determiner for determining whether or not each gray-scale data item subject to conversion corresponds to a pixel affected by malfunction of ejection; and
 a converter for converting the gray-scale data item subject to conversion to an ejection pattern data item, wherein
 based on the determination result by the determiner, if the gray-scale data item corresponds to a pixel not affected by malfunction of ejection, the converter converts the gray-scale data item to the ejection pattern data item by referring to a first table for a pixel not affected by malfunction of ejection, and
 based on the determination result by the determiner, if the gray-scale data item corresponds to a pixel affected by malfunction of ejection, the converter converts the grayscale data item to the ejection pattern data item by referring to a second table an which ejection data bits are arranged in a manner such that droplets are to be deflectively ejected only from nozzles that function properly.

12. The ejection control device according to claim 11, wherein the second table comprises first and second table components, the first table component being used for a nozzle which is determined to be malfunctional, the second table component being used for a nozzle adjacent to the malfunctional nozzle in the deflecting direction.

13. The ejection control device according to claim 11, wherein one of the first and second tables comprises multiple types of table components, and wherein the ejection control device further comprises a selector for selecting one of the table components for grayscale data conversion.

14. A liquid-ejecting apparatus provided with an ejection head, the ejection head having nozzles each being capable of ejecting droplets to multiple pixel ranges by deflection of the droplets, the liquid-ejecting apparatus comprising:
 a determiner for determining whether or not a grayscale data item subject to conversion corresponds to a pixel affected by malfunction of ejection;
 a converter for converting the gray-scale data item subject to conversion to an ejection pattern data item, wherein
 based on the determination result by the determiner, if the gray-scale data item corresponds to a pixel not affected by malfunction of ejection, the converter converts the gray-scale data item to the ejection pattern data item by referring to a first table for a pixel not affected by malfunction of ejection, and
 based on the determination result by the determiner, if the gray-scale data item corresponds to a pixel affected by malfunction of ejection, the converter converts the grayscale data item to the ejection pattern data item by referring to a second table in which ejection data bits are arranged in a manner such that droplets are to be deflectively ejected only from nozzles that function properly; and
 an ejection driver for ejecting droplets based on the ejection pattern data item via the ejection head.

15. A method for controlling ejection of droplets for a liquid-ejecting apparatus provided with an ejection head, the ejection head having nozzles each being capable of ejecting droplets to multiple pixel ranges by deflection of the droplets, the method comprising the steps of:
 determining whether or not each gray-scale data item subject to conversion corresponds to a pixel affected by malfunction of ejection; and
 converting the gray-scale data item subject to conversion to an ejection pattern data, wherein
 based on the determination result, if the gray-scale data item corresponds to a pixel not affected by malfunction of ejection, the converter converts the gray-scale data item to the ejection pattern data item by referring to a first table for a pixel not affected by malfunction of ejection, and
 based on the determination result by the determiner, if the gray-scale data item corresponds to a pixel affected by malfunction of ejection, the converter converts the grayscale data item to the ejection pattern data item by referring to a second table in which ejection data bits are arranged in a manner such that droplets are to be deflectively ejected only from noziles that function properly.

16. A recording medium having recorded thereon a program which can be implemented by a processor controlled machine, wherein the program causes the processor to determine whether or not each gray-scale data item subject to conversion corresponds to a pixel affected by malfunction of ejection, and
 based on the determination result, the program causes the processor to convert the gray-scale data item subject to conversion to an ejection pattern data item by referring to a first table for a pixel not affected by malfunction of ejection if the gray-scale data item corresponds to a pixel not affected by malfunction of ejection, whereas the program causes the processor to convert the gray-scale data item subjece to conversion to an ejection pattern data item by referring to a second table in which ejection data bits are arranged in a manner such that droplets are to be deflectively ejected only from nozzles that function properly if the gray-scale data item corresponds to a pixel affected by malfunction of ejection.

17. A computer program for allowing a computer to determine whether or not each gray-scale data item subject to conversion corresponds to a pixel affected by malfunction of ejection,
 wherein based on the determination result, the program controls the computer to convert the gray-scale data item subject to conversion to an ejection pattern data item by referring to a first table having data for a pixel not affected by malfunction of ejection if the gray-scale data item corresponds to a pixel not affected by malfunction of ejection, whereas the program allows the computer to convert the gray-scale data item subject to conversion to an ejection pattern data item by referring to a second table in which ejection data bits are arranged in a manner such that droplets are to be deflectively ejected only from nozzles that function properly if the gray-scale data item corresponds to a pixel affected by malfunction of ejection.

* * * * *